(12) United States Patent
Canich et al.

(10) Patent No.: US 6,492,473 B1
(45) Date of Patent: Dec. 10, 2002

(54) MIXED TRANSITION METAL CATALYST SYSTEMS FOR OLEFIN POLYMERIZATION

(75) Inventors: Jo Ann Marie Canich, Webster, TX (US); George Alan Vaughan, Houston, TX (US); Phillip T. Matsunaga, Houston, TX (US); David Edward Gindelberger, Bedminster, NJ (US); Timothy Daniel Shaffer, Houston, TX (US); Kevin Richard Squire, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 61 days.

(21) Appl. No.: 09/633,303

(22) Filed: Aug. 8, 2000

Related U.S. Application Data

(62) Division of application No. 08/877,390, filed on Jun. 17, 1997, now Pat. No. 6,194,341.
(60) Provisional application No. 60/019,626, filed on Jun. 17, 1996.

(51) Int. Cl.$^7$ ................................................ C08F 4/70
(52) U.S. Cl. .................. 526/117; 526/114; 526/115; 526/116; 526/160; 526/161; 526/170; 526/172; 526/943
(58) Field of Search ................ 526/113, 114, 526/115, 116, 160, 117, 172, 943; 525/240, 191; 502/102

(56) References Cited

U.S. PATENT DOCUMENTS

| | | | |
|---|---|---|---|
| 4,182,810 A | 1/1980 | Willcox | 526/64 |
| 4,530,914 A * | 7/1985 | Ewen et al. | 502/113 |
| 4,543,399 A | 9/1985 | Jenkins, III et al. | 526/70 |
| 4,588,790 A | 5/1986 | Jenkins, III et al. | 526/70 |
| 4,665,208 A | 5/1987 | Welborn, Jr. et al. | 556/179 |
| 4,701,432 A | 10/1987 | Welborn, Jr. | 502/113 |
| 4,716,205 A | 12/1987 | Klabunde | 526/115 |
| 4,808,561 A | 2/1989 | Welborn, Jr. | 502/104 |
| 4,871,705 A | 10/1989 | Hoel | 502/117 |
| 4,874,734 A | 10/1989 | Kioka et al. | 502/104 |

(List continued on next page.)

FOREIGN PATENT DOCUMENTS

| | | |
|---|---|---|
| EP | 0 114 434 A | 8/1984 |
| EP | 0 454 231 A | 10/1991 |

(List continued on next page.)

OTHER PUBLICATIONS

Starzewski, K. A. O.; Witte, J.; Reichert, K. H.; Vasiliou, G. in Transition Metals and Organometallics as Catalysts for Olefin Polymerization, W. Kaminsky and H. Sinn (Eds.) Springer–Verlag: Berlin, 1988, pp 1349–360.*

(List continued on next page.)

Primary Examiner—David W. Wu
Assistant Examiner—Rip A. Lee
(74) Attorney, Agent, or Firm—William G. Muller; Stephen D. Prodnuk; Charles E. Runyan

(57) ABSTRACT

The invention encompasses a mixed transition metal olefin polymerization catalyst system suitable for the polymerization of olefin monomers comprising one late transition metal catalyst system and at least one different catalyst system selected from the group consisting of late transition metal catalyst systems, transition metal metallocene catalyst systems or Ziegler-Natta catalyst systems. Preferred embodiments include at least one late transition metal catalyst system comprising a Group 9, 10, or 11 metal complex stabilized by a bidentate ligand structure and at least one transition metal metallocene catalyst system comprising a Group 4 metal complex stabilized by at least one ancillary cyclopentadienyl ligand. The polymerization process for olefin monomers comprises contacting one or more olefins with these catalyst systems under polymerization conditions.

57 Claims, 1 Drawing Sheet

U.S. PATENT DOCUMENTS

| | | | | |
|---|---|---|---|---|
| 4,892,851 A | | 1/1990 | Ewen et al. | 502/104 |
| 4,897,455 A | | 1/1990 | Welborn, Jr. | 526/129 |
| 4,908,463 A | | 3/1990 | Bottelberghe | 556/179 |
| 4,912,074 A | | 3/1990 | Chang | 502/107 |
| 4,914,253 A | | 4/1990 | Chang | 585/523 |
| 4,924,018 A | | 5/1990 | Bottelberghe | 556/179 |
| 4,935,397 A | | 6/1990 | Chang | 502/117 |
| 4,937,217 A | | 6/1990 | Chang | 502/111 |
| 4,937,299 A | * | 6/1990 | Ewen et al. | 526/119 |
| 4,937,301 A | | 6/1990 | Chang | 526/128 |
| 4,952,540 A | | 8/1990 | Kioka et al. | 502/9 |
| 4,968,827 A | | 11/1990 | Davis | 556/179 |
| 4,987,200 A | | 1/1991 | Datta et al. | 526/75 |
| 5,001,205 A | | 3/1991 | Hoel | 526/128 |
| 5,008,204 A | | 4/1991 | Stehling | 436/85 |
| 5,008,228 A | | 4/1991 | Chang | 502/111 |
| 5,017,714 A | | 5/1991 | Welborn, Jr. | 556/12 |
| 5,028,670 A | | 7/1991 | Chinh et al. | 526/73 |
| 5,030,606 A | | 7/1991 | Klabunde | 502/155 |
| 5,041,584 A | | 8/1991 | Crapo et al. | 556/179 |
| 5,055,438 A | | 10/1991 | Canich | 502/117 |
| 5,057,475 A | | 10/1991 | Canich et al. | 502/104 |
| 5,064,802 A | | 11/1991 | Stevens et al. | 502/155 |
| 5,079,205 A | | 1/1992 | Canich | 502/117 |
| 5,086,205 A | | 2/1992 | Chang | 502/117 |
| 5,091,352 A | | 2/1992 | Kioka et al. | 502/103 |
| 5,096,867 A | | 3/1992 | Canich | 502/103 |
| 5,103,031 A | | 4/1992 | Smith, Jr. | 556/179 |
| 5,132,380 A | | 7/1992 | Stevens et al. | 526/126 |
| 5,147,949 A | | 9/1992 | Chang | 526/129 |
| 5,153,157 A | | 10/1992 | Hlatky et al. | 502/117 |
| 5,157,137 A | | 10/1992 | Sangokoya | 556/179 |
| 5,198,401 A | | 3/1993 | Turner et al. | 502/155 |
| 5,204,419 A | | 4/1993 | Tsutsui et al. | 526/153 |
| 5,206,199 A | | 4/1993 | Kioka et al. | 502/117 |
| 5,235,081 A | | 8/1993 | Sangokoya | 556/179 |
| 5,238,892 A | | 8/1993 | Chang | 502/111 |
| 5,240,894 A | | 8/1993 | Burkhardt et al. | 502/108 |
| 5,241,025 A | | 8/1993 | Hlatky et al. | 526/129 |
| 5,248,801 A | | 9/1993 | Sangokoya | 556/179 |
| 5,264,505 A | | 11/1993 | Shimizu et al. | 526/62 |
| 5,266,544 A | * | 11/1993 | Tsutsui et al. | 502/113 |
| 5,274,056 A | | 12/1993 | McDaniel et al. | 526/106 |
| 5,278,119 A | | 1/1994 | Turner et al. | 502/155 |
| 5,278,264 A | | 1/1994 | Spaleck et al. | 526/127 |
| 5,281,679 A | | 1/1994 | Jejelowo et al. | 526/114 |
| 5,296,434 A | | 3/1994 | Karl et al. | 502/117 |
| 5,304,614 A | | 4/1994 | Winter et al. | 526/127 |
| 5,308,816 A | | 5/1994 | Tsutsui et al. | 502/104 |
| 5,318,935 A | | 6/1994 | Canich et al. | 502/117 |
| 5,321,106 A | | 6/1994 | LaPointe | 526/126 |
| 5,324,800 A | | 6/1994 | Welborn, Jr. et al. | 526/160 |
| 5,329,032 A | | 7/1994 | Tran et al. | 556/179 |
| 5,347,024 A | | 9/1994 | Nickias et al. | 556/11 |
| 5,352,749 A | | 10/1994 | DeChellis et al. | 526/68 |
| 5,359,015 A | | 10/1994 | Jejelowo | 526/114 |
| 5,369,196 A | | 11/1994 | Matsumoto et al. | 526/127 |
| 5,374,696 A | | 12/1994 | Rosen et al. | 526/126 |
| 5,382,630 A | | 1/1995 | Stehling et al. | 525/240 |
| 5,382,631 A | | 1/1995 | Stehling et al. | 525/240 |
| 5,382,638 A | | 1/1995 | Bontemps et al. | 526/67 |
| 5,387,568 A | | 2/1995 | Ewen et al. | 502/104 |
| 5,395,810 A | * | 3/1995 | Shamshoum et al. | 502/113 |
| 5,405,922 A | | 4/1995 | DeChellis et al. | 526/68 |
| 5,408,017 A | | 4/1995 | Turner et al. | 526/134 |
| 5,427,991 A | | 6/1995 | Turner | 502/103 |
| 5,436,304 A | | 7/1995 | Griffin et al. | 526/68 |
| 5,453,471 A | | 9/1995 | Bernier et al. | 526/68 |
| 5,470,993 A | | 11/1995 | Devore et al. | 556/11 |
| 5,494,874 A | | 2/1996 | Rosen et al. | 502/155 |
| 5,502,128 A | | 3/1996 | Flores et al. | 526/160 |
| 5,504,049 A | | 4/1996 | Crowther et al. | 502/117 |
| 5,504,169 A | | 4/1996 | Canich | 526/127 |
| 5,622,906 A | * | 4/1997 | Pettijohn | 502/104 |
| 5,643,846 A | * | 7/1997 | Reddy et al. | 502/104 |
| 5,670,587 A | * | 9/1997 | Takeuchi et al. | 526/119 |
| 5,691,264 A | * | 11/1997 | Sacchetti et al. | 502/134 |
| 5,714,427 A | * | 2/1998 | Winter et al. | 502/117 |
| 5,714,556 A | | 2/1998 | Johnson et al. | 526/135 |

FOREIGN PATENT DOCUMENTS

| | | |
|---|---|---|
| EP | 0 308 177 B | 7/1992 |
| EP | 0 591 756 A | 4/1993 |
| EP | 0 578 838 A | 1/1994 |
| EP | 0 612 768 | 8/1994 |
| EP | 0 426 637 B | 4/1995 |
| EP | 0 520 732 B | 12/1995 |
| EP | 0 427 697 B | 5/1996 |
| EP | 0 495 375 B | 2/1997 |
| EP | 0 768 319 A | 4/1997 |
| EP | 0 514 828 B | 11/1997 |
| EP | 0 573 403 B | 11/1998 |
| EP | 0 594 218 B | 3/1999 |
| EP | 0 561 476 B | 9/1999 |
| EP | 0 577 581 B | 7/2000 |
| WO | WO 91/09882 | 7/1991 |
| WO | WO 92/00333 | 1/1992 |
| WO | WO 93/03093 | 2/1993 |
| WO | WO 93/14132 | 7/1993 |
| WO | WO 93/19103 | 9/1993 |
| WO | WO 93/19104 | 9/1993 |
| WO | WO 93/25590 | 12/1993 |
| WO | WO 94/03506 | 2/1994 |
| WO | WO 94/10180 | 5/1994 |
| WO | WO 94/17113 | 8/1994 |
| WO | WO 94/21962 | 9/1994 |
| WO | WO 94/28032 | 12/1994 |
| WO | WO 95/07941 | 3/1995 |
| WO | WO 95/07942 | 3/1995 |
| WO | WO 95/15815 | 6/1995 |
| WO | WO 96/00245 | 1/1996 |
| WO | WO 96/04319 | 2/1996 |
| WO | WO 96/23010 | 8/1996 |
| WO | WO 97/02298 | 1/1997 |
| WO | WO 97/48736 | 12/1997 |

OTHER PUBLICATIONS

Denger, C.; Haase, U.; Fink, G. Makromol. Chem., Rapid Commun. 1991, 12, 697.*

Johnson, L. K.; Killian, C. M.; Brookhart, M. J. Am. Chem. Soc. 1995, 117, 6414.*

"New Pd(II)–and Ni(II)–Based Catalysts for Polymerization of Ethylene and α–Olefins", Johnson, et al., *J. American Chem. Soc.*,(1995), pp. 6414–6415.

"Simultaneous Oligomerization and Polymerization of Ethylene", Denger, C., et al., *Makromolekulare Chemie, Rapid Communications*, v.12(12) (1991) pp. 697–701.

Database WPI Section Ch. Week 9413, Derwent Publicatiuons Ltd., London, m GB; Class A 17, AN 94–107675 & SU 1 455 650 A (Krentsel B A), 15 (1993).

"Polymerization of Olefins with Noble Metal (Ru, Rh, PD) Co pounds Activated By Alkylaluminium or Alkyltitanium Compounds", Kazuo Soga, et al., *Makromolekulare Chemie, Rapid Communications*, v. 11(6) (1990), pp. 285–291.

"New Pd(II)–and Ni(II)–Based Catalysts for Polymerization of Ethylene and α–Olefins", Johnson, et al., Dept. of Chemistry, University of North Carolina at Chapel Hill, NC—Presentation—date (unknown).

"ansa–Zirconocene Polymerization Catalysts with Annelated Ring Ligands—Effects on Catalytic Activity and Polymer Chain Lengths" Brinzinger, H., et al, *Organometallics* 1994, 13, 964–970.

R. Lew, et al., "SEC–Viscometer Detector Systems. I. Calibration and Determination of Mark–Houwink Constants", *J. of Applied Polym. Sci.*, v.47 (1993), pp. 1685–1700.

Spaleck, et al., "The Influence of Aromatic Substituents on the Polymerization Behavior of Bridged Zirconocene Catalysts", *Organometallics*, (1994), v.13, pp. 954–963.

Wisenfeldt, et al., ansa–Metallocene Derivatives. XVII. Racemic and meso diastereomers of group IV . . . , *J. of Organometallic Chemistry*, v.369 (1989), pp. 359–370.

U.S. patent application Ser. No. 08/412,507 filed Mar. 29, 1995.

U.S. patent application Ser. No. 08/487,255 filed Jun. 7, 1995.

U.S. patent application Ser. No. 08/474,948 filed Jun. 7, 1995.

\* cited by examiner

MIXED TRANSITION METAL CATALYST SYSTEMS FOR OLEFIN POLYMERIZATION

This Application is a divisional of U.S. application Ser. No. 08/877,390, filed Jun. 17, 1997, now issued as U.S. Pat. No. 6,194,341, which claims priority of provisional application No. 60/019,626, filed Jun. 17, 1996.

FIELD OF THE INVENTION

This invention relates to mixed transition metal catalyst systems comprising late transition metal catalyst compounds and metallocene compounds and polymerization of olefins using them.

BACKGROUND OF THE INVENTION

Early transition metal catalysts for olefin polymers by coordination polymerization are well-known, typically those are the traditional Ziegler-type catalysts based on Group 4 and 5 of the Periodic Table (IUPAC new notation) and the newer metallocene catalysts based on Group 4–6 metals. However specific late transition metal catalysts suitable for olefin polymerization had not offered the same levels of activity or molecular weight capability for olefin polymerization during the development of these catalyst systems and additional work was published addressing this lack.

In Johnson, Killian, and Brookhart, *J. Am. Chem. Soc.,* 1995, 117, 6414 the reporters describe the use of Ni and Pd complexes for the solution homopolymerization of ethylene, propylene, and 1-hexene. The catalyst precursors are square-planar, $M^{2+}$, $d^8$, 16 electron complexes incorporating substituted, bidentate diimine ligands. The active coordination sites are occupied by either methyl or bromide ligands. Methyl ligand complexes were activated with $H^+(OEt_2)_2[B(3,5-(CF_3)_2C_6H_3)_4]^-$ and bromide ligand complexes were activated with methylalumoxane (MAO) or diethylaluminumchloride as cocatalysts.

European patent publication EP-A2-0 454 231 describes Group VIIIb metal catalysts said to be suitable for the polymerization of ethylene, a-olefins, diolefins, functionalized olefins, and alkynes. The described catalyst precursors are Group VIIIb metal (Groups 8, 9, 10, IUPAC new nomenclature) compounds which are subsequently activated by compounds including discrete borate anions. Ethylene homopolymerization in solutions of methylene chloride, toluene and diethyl ether are illustrated.

Since the new late transition metal catalysts exhibit characteristics different from those of transition metal metallocene catalysts or traditional Ziegler-Natta catalysts when used in olefin polymerization, the effects of mixing those catalysts for determining useful benefits are of great interest.

SUMMARY OF THE INVENTION

The invention encompasses a mixed transition metal olefin polymerization catalyst system suitable for the polymerization of olefin monomers comprising one late transition metal catalyst system and at least one different catalyst system selected from the group consisting of late transition metal catalyst systems, transition metal metallocene catalyst systems or traditional Ziegler catalyst systems. Preferred embodiments include a mix of at least two late transition metal catalyst system comprising a Group 9, 10, or 11 metal complex stabilized by a bidentate ligand structure, and at least one late transition metal catalyst system, as described, and at least one transition metal metallocene catalyst system comprising a Group 4 metal complex stabilized by at least one ancillary cyclopentadienyl ligand, or at least one late transition metal catalyst system, as described, and at least one Ziegler-Natta catalyst system selected from the group consisting of homogeneous vanadium catalysts and heterogeneous $TiCl_3/MgCl_2$ donor catalyst systems. The polymerization process for olefin monomers comprises contacting one or more olefins with these catalyst systems under polymerization conditions.

DETAILED DESCRIPTION OF THE INVENTION

Figure 1:
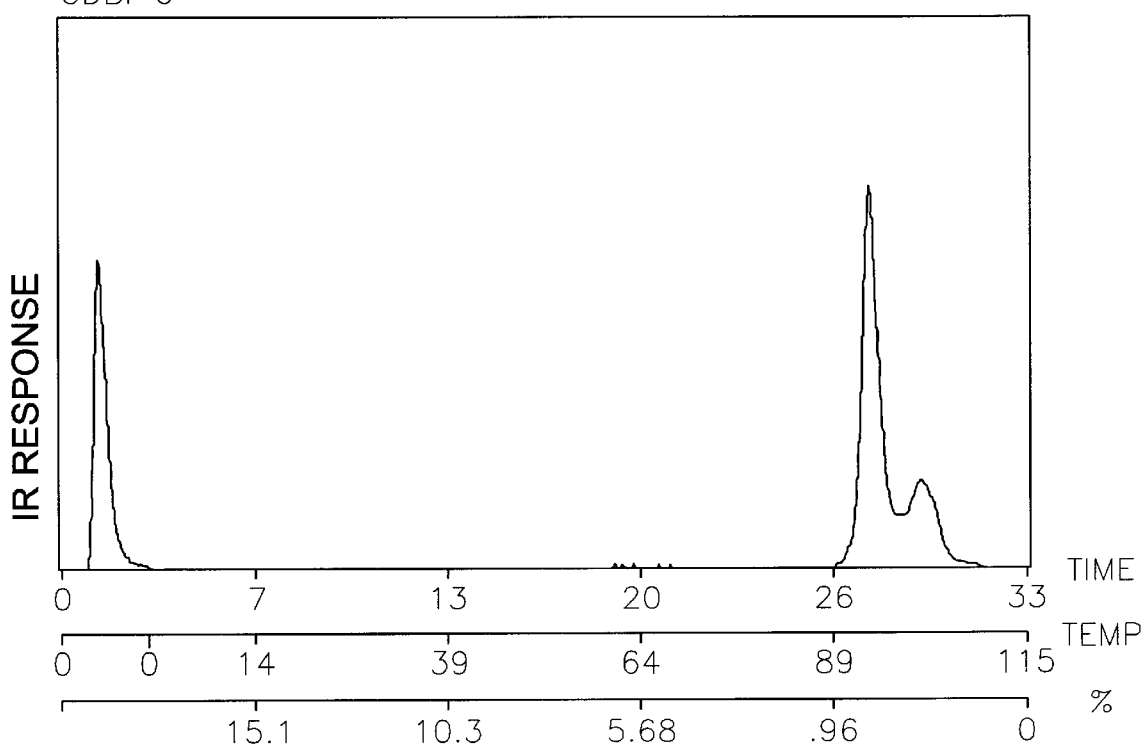
FIGS. 1–2 are compositional distribution (CD)traces by Temperature Rising Elution Fractionation ("TREF") as described in U.S. Pat. No. 5,008,204 of polymer samples P2-2 to P2-3, respectively.

The late transition metal catalyst systems of this invention can be derived from the late transition metal compounds of formula:

$$LMX_r$$

wherein M is a Group 9, 10, or 11 metal, preferably a $d^6$, $d^8$ or $d^{10}$ metal, most preferably $d^8$; L is a bidentate ligand that stabilizes a square planar geometry and charge balances the oxidation state of $MX_r$; each X is, independently, a hydride radical, a hydrocarbyl radical, a substituted hydrocarbyl radical, a halocarbyl radical, a substituted halocarbyl radical, and hydrocarbyl- and halocarbyl-substituted organometalloid radicals; or two X's are joined and bound to the metal atom to form a metallacycle ring containing from about 3 to about 20 carbon atoms; or one or more X can be a neutral hydrocarbyl containing donor ligand, e.g., an olefin, diolefin, or aryne ligand; and r=0, 1, 2, or 3. When Lewis-acid activators, such as methylalumoxane, aluminum alkyls, or alkylaluminum halides, which are capable of donating an X ligand, as described above, to the transition metal component, are used, or when the ionic activator is capable of extracting X, one or more X may additionally be independently selected from the group consisting of a halogen, alkoxide, aryloxide, amide, phosphide or other univalent anionic ligand; two such X's joined to form an anionic chelating ligand; or, one or more neutral non-hydrocarbyl atom containing donor ligand, e.g., phosphine, amine, nitrile or CO ligand.

In a preferred embodiment of the invention, the bidentate ligand, L, is defined by the following formula:

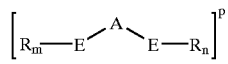

wherein A is a bridging group containing a Group 13–15 element; each E is independently a Group 15 or 16 element bonded to M; each R is independently a $C_1$–$C_{30}$ containing radical or diradical group which is a hydrocarbyl, substituted-hydrocarbyl, halocarbyl, substituted-halocarbyl, hydrocarbyl-substituted organometalloid, halocarbyl-substituted organometalloid, m and n are independently 1 or 2 depending on the valency of E; and p is the charge on the bidentate ligand such that the oxidation state of $MX_r$ is satisfied.

In the most preferred embodiment of the invention, the bridging group, A, is defined by the following formulae:

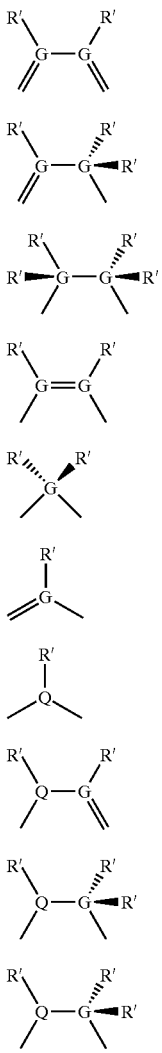

A-1
A-2
A-3
A-4
A-5
A-6
A-7
A-8
A-9
A-10 wherein G is a Group 14 element especially C, Si, and Ge; Q is a Group 13 element especially B and Al; and R' are independently hydride radicals, $C_1$–$C_{30}$ hydrocarbyl radicals, substituted hydrocarbyl radicals, halocarbyl radicals, substituted halocarbyl radicals, and hydrocarbyl- and halocarbyl-substituted organometalloid radicals, and optionally two or more adjacent R' may form one or more $C_4$ to $C_{40}$ rings to give a saturated or unsaturated cyclic or polycyclic ring.

Also in the most preferred embodiment of the invention, each R is independently a bulky $C_1$–$C_{30}$ containing radical group which is a hydrocarbyl, substituted-hydrocarbyl, halocarbyl, substituted-halocarbyl, substituted organometalloid, hydrocarbyl-substituted organometalloid, or halocarbyl-substituted organometalloid. Bulky radical groups include phenyls, substituted phenyls, alkyls and substituted alkyls, especially those bonded to E through a tertiary carbon atom, and alicyclic and polyalicyclic containing hydrocarbyls, especially those bonded to E through a tertiary carbon and the like.

In the definitions above, the term "substituted" is as defined or refers to $C_1$–$C_{30}$ containing radicals which are to be essentially hydrocarbyl, but may include one or more non-hydrocarbyl atoms (such as Si, Ge, O, S, N, P, halogen, etc.) in place of one or more carbon atoms.

In the very most preferred embodiment of this invention, M is a group 10 metal, E is a group 15 element especially nitrogen with m and n being one and p being zero, the bridge is as drawn in A-1, and R is a substituted phenyl group preferably substituted in at least the 2 and 6 positions with R' groups. For high molecular polymers, R' in the 2 and 6 positions is preferably a $C_3$–$C_{30}$ hydrocarbyl group preferably with a secondary or tertiary carbon atom bonded to the phenyl group. For lower molecular weight polymers, R in the 2 and 6 positions are preferably a $C_1$–$C_2$ hydrocarbyl group or a $C_3$–$C_{10}$ hydrocarbyl group with a primary carbon atom bonded to the phenyl group. For macromer preparation, R in the 2 and 6 positions is hydride.

The transition metal metallocene catalyst systems comprising a Group 4 metal complex stabilized by at least one ancillary cyclopentadienyl ligand according to this invention are those known in the art as metallocene catalysts. The term includes those compounds containing a single cyclopentadienyl ligand or a substituted derivative thereof ("monocyclopentadienyl metallocenes"), and those containing two cyclopentadienyl ligands or substituted and unsubstituted derivatives thereof ("biscyclopentadienyl metallocenes"). Either class may be unbridged or may be bridged, e.g., between the two cyclopentadienyl ligands on, or between the single cyclopentadienyl ligand and a heteroatom ligand on, the same transition metal center. Precursor compounds for and the catalyst systems themselves are well-known in the art.

Additional description of metallocene compounds appear in the patent literature, for example U.S. Pat. Nos. 4,871,705, 4,937,299, 5,324,800, EP-A-0 418 044, EP-A-0 591 756, WO-A-92/00333 and WO-A-94/01471. The metallocene compounds of this invention are those described as mono- or bis-substituted Group 4, 5, 6, 9, or 10 transition metal compounds wherein the cyclopentadienyl substituents may be themselves substituted with one or more groups and may be bridged to each other, or may be bridged through a heteroatom to the transition metal. Preferably for higher molecular weight polymer components the biscyclopentadienyl (or substituted biscyclopentadienyl, such as indenyl or substituted indenyl) rings, will be bridged and will be lower alkyl-substituted ($C_1$–$C_6$) in the 2 position and will additionally comprise alkyl, cycloalkyl, aryl, alkylaryl and or arylalkyl substituents, the latter as either of fused or pendant ring structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with not more than 1–3 non-hydrogen/carbon atoms, e.g., N, S, O, P, Si or Ge.

Metallocene compounds suitable for the preparation of linear polyethylene or ethylene-containing copolymers (where copolymer means comprising at least two different monomers) are essentially any of those known in the art, see WO-A-92/00333 and U.S. Pat. Nos. 5,001,205, 5,057,475, 5,198,401, 5,304,614, 5,308,816 and 5,324,800 for specific listings. Selection of metallocene compounds for use to make isotactic or syndiotactic polypropylene blends, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, for example, U.S. Pat. Nos. 4,892,851, 5,017,714, 5,296,434, 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein.

Preferably the monocyclopentadienyl metallocene catalyst components are those additionally comprising a Group 15 or 16 heteroatom covalently bound both to the Group 4 transition metal center and, through a bridging group, to a ring carbon of the cyclopentadienyl group-containing ligand. Such catalysts are well-known in the art, see, e.g., background U.S. Pat. Nos. 5,055,438, 5,096,867, 5,264,505, 5,408,017, 5,504,169 and WO 92/00333. See also, U.S. Pat. Nos. 5,374,696, 5,470,993 and 5,494,874; and, see, international publications WO 93/19104 and EP 0 514 828 A. For cyclic olefin-containing copolymers, see WO-94/17113, copending U.S. Ser. No. 08/412,507, filed Mar. 29, 1995, and copending application U.S. Ser. No. 08/487,255, filed Jun. 7, 1995, and published as WO 96/002444. Additionally, the unbridged monocyclopentadienyl, heteroatom-containing Group 4 transition metal catalyst components of copending U.S. patent application Ser. No. 08/545,973, filed Sep. 25, 1995, will be suitable in accordance with the invention. Each of the foregoing references are incorporated by reference for the purposes of U.S. patent practice.

Non-limiting representative metallocene compounds include mono-cyclopentadienyl compounds such as pentamethylcyclopentadienyltitanium tri(isopropoxide), pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-cyclododecylamido hafnium dihydride, dimethylsilyltetramethylcyclopentadienyl-dodecylamido titanium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl; bridged biscyclopentadienyl compounds such as dimethylsilylbis (tetrahydroindenyl) zirconium dichloride dimethylsilylbisindenyl zirconium dichloride, dimethylsilylbisindenyl hafnium dimethyl, dimethylsilylbis(2-methylbenzindenyl) zirconium dichloride, dimethylsilylbis (2-methylbenzindenyl) zirconium dimethyl; and the additional mono-, bis-, and triscyclopentadienyl compounds such as those listed and described in U.S. Pat. No. 5,324,800 and EP-A-0 591 756.

Traditional Ziegler-Natta transition metal catalyst systems ("Z-N" systems) typically comprise a Group 4, 5 or 6 transition metal halide or oxyhalide, a Ziegler cocatalyst and optional donor molecules. These catalyst systems are well known and can be used in accordance with the invention. The description of U.S. Pat. Nos. 4,701,432 and 4,987,200 contain suitable description of the catalyst compounds useful in this invention. Both are incorporated by reference for purposes of U.S. patent practice. In particular, see column 5 line 27 to column 6 line 5 of U.S. Pat. No. 4,701,432 and column 27 line 22 to column 28 line 17 of U.S. Pat. No. 4,987,200. The preferred catalysts according to this invention for elastomeric polymers are those of U.S. Pat. No. 4,987,200. For polyethylene and isotactic polypropylene, both homo- and copolymers, the traditionally known catalyst systems suitable for each will be suitable in accordance with this invention.

It should be realized to those skilled in the art, that other catalyst systems may also be used as a component for the mixed catalyst system of this invention. Examples include teachings from U.S. Pat. Nos. 5,079,205; 5,318,935; 5,504,049, each of which is incorporated by reference for purposes of U.S. patent practice.

Though in theory any ratio of catalysts systems to another can be used. The preferred ratio based on moles of transition metal is 200:1 to 1:1. Here transition metal means two different members of the class of catalysts of the invention. When more than two catalyst systems are used, the preferred ratio between any two is as described. In setting the ratios it is well known in the art it is important to choose the ratio to account for differences in polymerization activities of the selected systems under the selected conditions. For example, the presence of α-olefins will depress the activity of the late transition metal catalyst system relative to the metallocene system. Thus, if only a minor portion of one polymer component is desired, a ratio of greater than 200:1 may be preferable.

For the purposes of this patent specification, the terms "cocatalysts or activators" are used interchangeably and are defined to be any compound or component which can activate the late transition metal compounds, the metallocene compounds, and the Z-N catalyst or any independently if they are to be independently activated.

The late transition metal compound, metallocene compounds, and Z-N catalyst according to the invention may be activated for polymerization catalysis in any manner sufficient to allow coordination polymerization. This can be achieved, for example, when each has one ligand which can be abstracted and another ligand that is capable of insertion of the olefinically unsaturated monomers or will be similarly abstractable for replacement with a ligand that is capable of insertion. The traditional activators of metallocene polymerization art are suitable activators; those typically include Lewis acids such as alumoxane compounds, and ionizing, anion pre-cursor compounds that abstract one ligand so as to ionize the transition metal center into a cation and provide a counterbalancing, compatible, noncoordinating anion. Additionally, traditional organometallic compound Ziegler cocatalysts may be utilized for the late transition metal catalysts and for the traditional Ziegler catalysts themselves.

When using a mixed catalyst system, the choice of catalyst activator or activators is dependent on the combination of transition metal compounds being used. The late transition metal compound may be activated with an alumoxane, Ziegler cocatalyst, "noncoordinating anion" precursor compounds and halide salts of the Group 13–16 metals each of which is described more fully below. The transition metal metallocene compounds are preferably activated with an alumoxane or "noncoordinating anion" precursor compounds. While most Ziegler cocatalysts are tolerated by most transition metal metallocene compounds, they are typically poor activators. Halide salts of the Group 13–16 metals should not be used with transition metal metallocene compounds. Traditional Ziegler-Natta catalysts are preferably activated by Ziegler cocatalysts. The presence of alumoxanes or "noncoordinating anion" precursor compounds should not present any problems, however the presence of halide salts of the Group 13–16 metals is not recommended. In the most preferred embodiment of this invention, when the mixed catalyst system comprises two or more different late transition metal compounds, any combination of activators listed above may be used. When the mixed catalyst system comprises one or more late transition metal compounds and one or more transition metal metallocene compounds, the preferred activator system is either "noncoordinating anion" precursor compounds or alumoxanes or a combination thereof, with alumoxanes being more highly preferred. When the mixed catalyst system comprises one or more late transition metal compounds and one or more traditional Ziegler-Natta catalysts, the most highly preferred activator is a Ziegler-cocatalyst.

Ziegler cocatalysts will typically be organometallic compounds of a metal of Groups 1, 2, 12 or 13 of the Periodic table of elements. Preferred are organoaluminum compounds selected from the group consisting of aluminum alkyl, aluminum alkyl halide and aluminum halide. These can be represented by the the formulae:

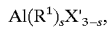
$$Al(R^1)_s X'_{3-s},$$

wherein $R^1$ is independently a hydride or $C_1$ to $C_{10}$ hydrocarbyl including aliphatic, alicyclic or aromatic hydrocarbon radical, X' is a halogen and s is an integer from 0 to 3; and,

$$Al_2 R^1_3 X'_3$$

which are hydrocarbylaluminum sesquihalides.

Examples include triethylaluminum, triisobutylaluminum, diethylaluminum chloride, $Al_2Et_3Cl_3$ and $Al_2(i\text{-Bu})_3Cl_3$. As is generally recognized in the art these Ziegler cocatalyst compounds will not effectively activate the metallocene compounds.

In unsupported catalyst systems when the activator is a Ziegler cocatalyst, the preferred molar ratio of late transition metal compound to Ziegler cocatalyst (typically measured as moles of aluminum) is from about 1:1000 to 1:1, more preferably from about 1:200 to 1:1 and most preferably from about 1:100 to 1:1, although higher or lower ratios may also be used. The preferred molar ratio of Ziegler-Natta catalyst (based on moles of transition metal atom) to Ziegler cocatalyst (typically measured as moles of aluminum) is preferably from about 1:10000 to 1:10, more preferably from about 1:5000 to 1:10 and most preferably from about 1:2000 to 1:10 although higher or lower ratios may also be used. The preferred molar ratios for the total transition metal compound to Ziegler cocatalyst is preferably from about 1:10000 to 1:1, more preferably from about 1:5000 to 1:1 and most preferably from about 1:2000 to 1:1, although higher or lower ratios may also be used. Total transition metal compound is measured as the total number of moles of transition metal atoms present in the mixed catalyst system.

Alkylalumoxanes and modified alkylalumoxanes are suitable as catalyst activators for all types of catalyst systems of the invention. The alumoxane component useful as catalyst activator typically is an oligomeric aluminum compound represented by the general formula $(R^2—Al—O)_n$, which is a cyclic compound, or $R^2(R^2—Al—O)_n AlR^2_2$, which is a linear compound. In the general alumoxane formula $R^2$ is independently a $C_1$ to $C_{10}$ hydrocarbyl radical, for example, methyl, ethyl, propyl, butyl or pentyl and "n" is an integer from 1 to about 100. $R^2$ may also be, independently, halogen, including fluorine, chlorine and iodine, and other non-hydrocarbyl monovalent ligands such as amide, alkoxide and the like, provided that not more than 25 mol % of $R^2$ are non-hydrocarbyl as described here. Most preferably, $R^2$ is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 131, EP 0 516 476 A, EP 0 594 218 A1 and WO 94/10180, each being incorporated by reference for purposes of U.S. patent practice.

In unsupported catalyst systems when the activator is an alumoxane, the preferred total transition metal compound to activator molar ratio is from 1:10000 to 10:1, more preferably from about 1:5000 to 10:1, even more preferably from about 1:1000 to 1:1.

The term "noncoordinating anion" as used for the ionizing, anion pre-cursor compounds ("noncoordinating anion pre-cusors") is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the transition-metal catalyst compounds and the ionizing, anion pre-cursor compounds decomposes. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the late transition metal cation or the transition metal metallocene catalyst in the sense of balancing its ionic charge, yet retain sufficient lability to permit displacement by an olefinically unsaturated monomer during polymerization. Additionally, the anions useful in this invention will be of sufficient molecular size to partially inhibit or help to prevent neutralization of the late-transition-metal cation by Lewis bases other than the polymerizable monomers that may be present in the polymerization process.

Descriptions of ionic catalysts, those comprising a transition metal cation and a non-coordinating anion, suitable for coordination polymerization appear in the early work in U.S. Pat. Nos. 5,064,802, 5,132,380, 5,198,401, 5,278,119, 5,321,106, 5,347,024, 5,408,017, WO 92/00333 and WO 93/14132. These teach a preferred method of preparation wherein metallocenes are protonated by an anion precursor such that an alkyl/hydride group is abstracted from a transition metal to make it both cationic and charge-balanced by the non-coordinating anion. These teachings are useful to those skilled in the art for the late-transition-metal catalysts of the present invention The use of ionizing ionic compounds not containing an active proton but capable of producing both the active metal cation and a noncoordinating anion is also known. See, EP-A-0 426 637, EP-A-0 573 403 and U.S. Pat. No. 5,387, 568. Reactive cations other than the Brönsted acids include ferricenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a noncoordinating anion as described above. The hydrated salts can be prepared by reaction of the metal cation-noncoordinating anion salt with water, for example, by hydrolysis of the commercially available or readily synthesized LiB(pfp)4 which yields [Li.xH$_2$O] [B(pfp)4], where (pfp) is pentafluorophenyl or perfluorophenyl.

Any metal or metalloid capable of forming a coordination complex, which preferably is resistant to degradation by water (or other Bronsted or Lewis Acids), may be used or contained in the anion. Suitable metals include, but are not limited to, aluminum, gold, platinum and the like. Suitable metalloids include, but are not limited to, boron, phosphorus, silicon and the like. The description of non-coordinating anions and precursors thereto of the documents of the foregoing paragraphs are incorporated by reference for purposes of U.S. patent practice.

An additional method of making the ionic catalysts uses noncoordinating anion precursors which are initially neutral Lewis acids but form the cation and anion upon ionizing reaction with the late transition metal compounds or the transition metal metallocene catalyst compounds, for example tris(pentafluorophenyl) boron acts to abstract a hydrocarbyl, hydride or silyl ligand to yield a transition metal cation and stabilizing non-coordinating anion; see EP-A-0 427 697 and EP-A-0 520 732 which are directed to metallocene catalyst systems. Ionic catalysts for coordination polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

When the cation portion of an ionic non-coordinating anion precursor cocatalyst is a Bronsted acid such as protons or protonated Lewis bases, or a reducible Lewis acid such as ferricenium or silver cations, or alkali metal or alkaline earth metal cations such as those of sodium, magnesium or lithium cations, the total transition metal to activator molar ratio may be any ratio, but preferably from about 10:1 to 1:10; more preferably from about 5:1 to 1:5; even more preferably from about 2:1 to 1:2; and most preferably from about 1.2:1 to 1:1.2 with the ratio of about 1:1 being the most preferred. Similar ratios may be used for other noncoordinating anion pre-cusor compounds.

The late transition metal catalyst compounds of this invention may also be activated with ionizing anion precursors including the halide salts of Group 13–16 metals or metalloids, preferably the fluoride and oxyfluoride salts, e.g., those providing the following anions: $BF_4^-$, $PF_6^-$, $SbF_6^-$, $TeOF_6^-$ and $AsF_6^-$. However, such activators would preferably be avoided if the mixed catalyst systems are jointly activated in situ since the metallocene compounds are sensitive to anions of insufficient bulk to provide compatibility.

When halide salts of Group 13–16 metals or metalloids are used as the activator, the preferred total transition metal compound to activator molar ratio is preferably from 10:1 to 1:10, more preferably from about 5:1 to 1:5, even more preferably from 2:1 to 1:2, and even more preferably from 1.2:1 to 1:1.2 with 1:1 being most preferred. Higher or lower ratios may also be used.

The late transition metal catalyst system components of this invention can additionally be prepared by combining in any order the bidentate ligand L, or a known precursor to it, with a suitable late transition metal complex, and an activator compound. For example, the bidentate ligand L precursor (2,6-i-Pr$_2$C$_6$H$_3$N=CH)$_2$ may be added to the late transition metal complex NiBr$_2$—(MeOCH$_2$CH$_2$OMe) in a solvent such as toluene having the activator compound methylalumoxane dissolved therein. Optionally, oxidizing or reducing agents may be used additionally to achieve the preferred $d^6$, $d^8$ or $d^{10}$ metal compounds. All reactants may be added in any order, or even essentially simultaneously. This activated catalyst may then be combined with a separately activated metallocene complex, or with a metallocene compound that is to be subsequently activated.

When using in the mixed catalyst systems ionic catalysts comprising metallocene cations and non-coordinating anions, the total catalyst system can additionally comprise one or more scavenging compounds. The term "scavenging compounds" is meant to include those effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity. The polar impurities, or catalyst poisons include water, oxygen, metal impurities, etc. While the late transition metal catalysts of the present invention can be less sensitive to impurities than the metallocene catalyst systems, reduction or elimination of poisons is a desirable objective, especially when using these mixed catalysts. Preferably steps are taken to avoid addition of such impurities into the reaction vessel, for example by chemical treatment or careful separation techniques after or during the synthesis or preparation of the various components. Some minor amounts of scavenging compound can still normally be used in the polymerization process itself but will be minimized to avoid decreased activities of the metallocene components.

Typically the scavenging compound will be an organometallic compound such as the Group 13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminoxane, and n-octyl aluminum. Those scavenging compounds having bulky or $C_8$–$C_{20}$ linear hydrocarbyl substituents covalently bound to the metal or metalloid center being preferred to minimize adverse interaction with the active catalyst. When alumoxane or Ziegler cocatalyst is used as activator, any excess over the amount of transition metal compound present will act as scavenger compounds and additional scavenging compounds may not be necessary. The amount of scavenging agent to be used with transition metal cation-non-coordinating anion pairs is minimized during polymerization reactions to that amount effective to enhance activity.

The addition of chain transfer agents or modifier components may also be added to the mixed catalyst system. Chain transfer agents suitable for lowering the molecular weight of the polymer produced from the transition metal metallocene or Ziegler-Natta catalyst systems includes compounds such as hydrogen and silanes of the formula $H_{4-x}SiR^*_x$, where x is 1, 2 or 3 and R is independently a $C_1$ to $C_{20}$ hydrocarbyl or hydrocarbyloxy radical such as but not limited to methyl, ethyl, propyl, butyl, pentyl, hexyl, heptyl, nonyl, decyl, dodecyl, phenyl, methoxy, ethoxy, propoxy, phenoxy, and the like. When alumoxanes or Ziegler cocatalysts are used as the activator component, alcohols such as ethanol, isopropanol or phenol, and boranes such as catechol borane may be used as chain transfer agents. The chain transfer agents described do not effectively lower the molecular weight of the polymer produced from the late transition metal catalyst system.

Immobilized catalyst systems of the invention will be useful in heterogeneous polymerization processes such as bulk, slurry and gas phase polymerization. They may be prepared by any effective method of supporting other coordination catalyst systems, effective meaning that the catalyst so prepared can be used for preparing polymer in the selected heterogeneous polymerization process. Preferred methods include those referred to in copending U.S. provisional application No. 60/020095, filed Jun. 17, 1996, in copending U.S. application Ser. No. 08/466,547, filed Jun. 6, 1995, and in its counterpart WO 96/00245, and in copending U.S. application Ser. No. 08/474,948, filed Jun. 7, 1995, published as WO 96/04319. The activated catalyst may also be supported in accordance with WO 91/0882 and WO 94/03506, particularly when using ionizing activators providing electronically stabilizing non-coordinating anions. All documents are incorporated for purposes of U.S. patent practice.

Additional methods appear in the following descriptions for metallocene catalysts, these methods will be suitable as well for the invention catalyst systems. U.S. Pat. No. 4,937,217 generally describes a mixture of trimethylaluminum and triethylaluminum added to an undehydrated silica to which a metallocene catalyst component is then added. EP-308177-B1 generally describes adding a wet monomer to a reactor containing a metallocene, trialkylaluminum and undehydrated silica. U.S. Pat. Nos. 4,912,075, 4,935,397 and 4,937,301 generally relate to adding trimethylaluminum to an undehydrated silica and then adding a metallocene to form a dry supported catalyst system. U.S. Pat. No. 4,914,253 describes adding trimethylaluminum to undehydrated silica, adding a metallocene and then drying the resulting supported catalyst system with an amount of hydrogen to produce a polyethylene wax. U.S. Pat. Nos. 5,008,228, 5,086,025 and 5,147,949 generally describe forming a dry supported catalyst system by the addition of trimethylaluminum to a water impregnated silica to form alumoxane in situ and then adding the metallocene. U.S. Pat. Nos. 4,808,561, 4,897,455 and 4,701,432 describe techniques to form a supported catalyst where the inert carrier, typically silica, is calcined and contacted with a metallocene(s) and an activator/cocatalyst component. U.S. Pat. No. 5,238,892 describes forming a dry supported catalyst system by mixing a metallocene with an alkyl aluminum and then adding undehydrated silica. U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier. All documents are likewise incorporated for purposes of U.S. patent practice.

Polymeric carriers will also be suitable in accordance with the invention, see for example the descriptions in WO 95/15815 and U.S. Pat. No. 5,427,991. As taught for metallocene catalysts in these documents, the catalyst complexes of this invention may be either adsorbed or absorbed, on the polymeric supports, particularly if made up of porous particles, or may be chemically bound through functional groups covalently bound to or in the polymer chains.

For the immobilized catalyst systems of the invention when the activator is an alumoxane, the preferred total transition metal compound to activator molar ratio is from 1:500 to 10:1, more preferably from about 1:200 to 10:1, even more preferably from about 1:120 to 1:1.

Suitable solid particle supports are typically comprised of polymeric or refractory oxide materials, each being preferably porous. Any support material, preferably a porous support material, such as for example, talc, inorganic oxides like silica, alumina, inorganic chlorides, for example magnesium chloride and resinous support materials such as polystyrene polyolefin or polymeric compounds or any other organic support material and the like that has an average particle size greater than 10 $\mu$m. The preferred support materials are inorganic oxide materials, which include those from the Periodic Table of Elements of Groups 2, 3, 4, 5, 13 or 14 metal or metalloid oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

In preferred embodiments of the process for this invention, the mixed catalyst system is employed in liquid phase (solution, slurry, suspension, bulk phase or combinations thereof), in high pressure liquid or supercritical fluid phase, or in gas phase. Each of these processes may be employed in singular, parallel or series reactors. The liquid processes comprise contacting olefinically unsaturated monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with olefinically unsaturated monomers in liquid monomer or inert diluent, the catalyst system typically being supported. Gas phase processes similarly use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,352,749, 5,382,638, 5,405,922, 5,422,999, 5,436,304, 5,453,471, and 5,463,999, and International applications WO 94/28032, WO 95/07942 and WO 96/00245. Each is incorporated by reference for purposes of U.S. patent practice. Typically the processes are conducted at temperatures of from about −100° C. to 150° C., preferably from about 40° C. to 120° C., at pressures up to about 7000 kPa, typically from about 690 kPa to 2415 kPa. Continuous processes using fluidized beds and recycle streams as the fluidizing medium are preferred.

Slurry polymerization processes in which the immobilized catalyst systems of this invention may be used are typically described as those in which the polymerization medium can be either a liquid monomer, like propylene, or a hydrocarbon solvent or diluent, advantageously aliphatic paraffin such as propane, isobutane, hexane, heptane, cyclohexane, etc. or an aromatic one such as toluene. The polymerization temperatures may be those considered low, e.g., less than 50° C., preferably 0–30° C., or may be in a higher range, such as up to about 120° C., preferably from 50° C. up to about 80° C., or at any ranges between the end points indicated. Pressures can vary from about 100 to about 700 psia (0.76–4.8 MPa) Additional description is given in U.S. Pat. Nos. 5,274,056 and 4,182,810 and WO 94/21962 which are incorporated by reference for purposes of U.S. patent practice.

Generally speaking the polymerization reaction temperature for solution, bulk or supercritical polymerization processes can vary from about −50° C. to about 250° C. Preferably the reaction temperature conditions will be from −20° C. to 220° C., more preferably below 200° C. The pressure can vary from about 1 mm Hg (0.1333 kPa) to 2500 bar (2.5×10$^5$ kPa), preferably from 0.1 bar to 1600 bar, most preferably from 1.0 to 500 bar. Where lower molecular weight copolymers, e.g., $M_n \leq 10,000$, are sought it will be suitable to conduct the reaction processes at temperatures above about 0° C. and pressures under 500 bar.

As will be apparent to those skilled in the art the catalyst compounds and components of this invention may be used with series or parallel reactors employing one or more such catalyst systems or components to prepare polymer blends comprising one or more of these invention copolymers or blends of them with other polymers and copolymers with properties associated with such blends, for example, broadened polydispersity for improved processing polymer compositions and improved impact strength polymer blend compositions.

In the process manner discussed above with the invention catalysts described in this application, unsaturated monomers, that is olefinically or ethylenically unsaturated monomers, may be polymerized so as to form polymer products having molecular weights (weight-average or $M_w$) from about 500 to about $3 \times 10^6$. Most typically, the polymer products will have an $M_w$ of from about 1000 to about $1.0 \times 10^6$. Suitable unsaturated monomers will include ethylene, $C_3$–$C_{20}$ α-olefins, $C_4$–$C_{20}$ gem-substituted olefins, $C_8$–$C_{20}$ aromatic substituted α-olefins, $C_4$–$C_{20}$ cyclic olefins, $C_4$–$C_{20}$ non-conjugated diolefins, or $C_{20}$–$C_{1000}$, and above, vinyl and vinylidene-terminated macromers. Preferably the polymer products will be any of polyethylene homopolymers, ethylene copolymers, particularly polyethylene plastomers and elastomers. And, in view of the known tolerance of the catalysts to polar monomers, ethylenically unsaturated polar monomers will additionally be polymerizable or copolymerizable. The preferred polar monomers include $C_4$–$C_{20}$ olefins containing functional groupings such as esters, carboxylates, nitriles, amines, amides, alcohols, halides carboxylic acids and the like. More preferably vinyl esters, halides and nitriles. Also, the masked monomers of U.S. Pat. No. 4,987,200 are suitable.

Another important characteristic of the polymer of the invention is its composition distribution (CD). A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions are assumed to have a Mn≧15,000, where Mn is the number average molecular weight fraction. Low weight fractions generally represent a trivial portion of the polymer of the present invention. The remainder of this description and the appended claims maintain this convention of assuming all weight fractions have a Mn≧15,000 in the CDBI measurement.

From the weight fraction versus composition distribution curve the CDBI is determined by establishing what weight percent of the sample has a comonomer content within 25% of each side of the median comonomer content. Further details of determining the CDBI of a copolymer are known to those skilled in the art. See, for example, PCT Patent Application WO 93/03093, published Feb. 18, 1993.

The polymers of the present invention in one embodiment have CDBI's generally in the range of greater than 50% to 99%, preferably in the range of 50% to 85%, and more preferably 55% to 80%, even more preferably greater than 60%, still even more preferably greater than 65%. Obviously, higher or lower CDBI's may be obtained using other catalyst systems with changes in the operating conditions of the process employed.

All molecular weights are weight average molecular weight unless otherwise noted. Molecular weights (weight average molecular weight ($M_w$) and number average molecular weight ($M_n$) were measured by Gel Permeation Chromatography, unless other wise noted, using a Waters 150 Gel Permeation Chromatograph equipped with a differential refractive index detector (DRI) and calibrated using polystyrene standards. Samples were run in 1,2,4-trichlorobenzene (145° C.) using three Shodex GPC AT-80 M/S columns in series. This general technique is discussed in "Liquid Chromatography of Polymers and Related Materials III" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision of 0.1 units for $M_w/M_n$ which was calculated from elution times. The numerical analyses were performed using Expert Ease software available from Waters Corporation. $M_w$ by GPC-VIS was measured using a Waters 150 Gel Permeation Chromatograph equipped with a Viscotek 150R detector and calibrated using polystyrene standards. Samples were run in 1,2,4-trichlorobenzene (135° C.) using a series of four Shodex AT802, 803, 804 and 805 columns. This general technique is discussed in R. U. Lew, P. Cheung, S. T. Balke and T. H. Moruy, Journal of Applied Polymer Science, 1993 47, 1685 and 1701, which is incorporated by reference for purposes of U.S., Patent practice herein. Corrections for column spreading were made using pentacontane as the standard.

The branching index g' is defined as:

$$g' = \frac{[\eta]_b}{[\eta]_l}$$

where $[\eta]_b$ is the intrinsic viscosity of the branched polymer and $[\eta]_l$ is the intrinsic viscosity of a linear polymer of the same molecular weight as the branched one. The above definition is unambiguous for monodisperse polymers. When applied to polydisperse whole polymers, branched and linear materials with the same viscosity-average molecular weight should be compared, to account for different polydispersities. This latter complication can be avoided in the GPC-VIS method since the intrinsic viscosity and the molecular weight are measured at individual elution volumes, which arguably contain narrowly-dispersed polymer.

The factor g' can be related to another branching index, g, using:

$$g' = g^k$$

(g is the ratio of the average square radii of gyration of a branched and linear polymer of the same molecular weight.) The exponent k is expected to vary between 0.5 and 1.5 depending on the type of branching structure present in the material. A value of k=0.7 has been recently used in the literature for LDPE. This value was also used in studies of model copolymers. Different values of k have been used in the literature by a variety of authors.

The Zimm-Stockmayer theory provides a means for relating the g factor to the amount of long-chain branching, $N_w$:

$$g = \frac{6}{N_w}\left[\frac{1}{2}\left(\frac{2+N_w}{N_w}\right)^{1/2}\ln\left(\frac{(2+N_w)^{1/2}+N_w^{1/2}}{(2+N_w)^{1/2}-N_w^{1/2}}\right)-1\right]$$

Finally, the long-chain branching frequency is determined using:

$$\text{Branching Frequency} = \frac{N_w}{M}(14{,}000)$$

where M is the molecular weight.

The above calculations are based on three main controlling assumptions:

The presence of short-chain branching (e.g., butyl, hexyl branches) is neglected, which leads to an overestimation of the amount and frequency of long-chain branching. The effect of this assumption on the accuracy of the calculations will depend on the amount of short-chain branching present in the material.

The exponent k is precisely known for the materials considered and does not change across the molecular weight distribution. Clearly the choice of k will have a profound effect on the accuracy of the final estimates of the amount and frequency of long-chain branching.

The Zimm-Stockmayer relationship, although derived for polymer in so-called theta solvent, is applicable for the same polymer in the solvent used for GPC-VIS, which is not a theta solvent.

Since the above assumptions are untested for the polymers considered here, the reported values for the amount and frequency of long-chain branching—hereafter referred to as branching—should be regarded as estimates and not as a direct and accurate determination of the true values. Nevertheless, the values can be profitably used to rank different materials relative to each other.

A primary advantage of the mixed catalysts of this invention is that blends can be produced in a single reactor without the difficulties and expense associated with an added physical blending step after production of the polymer in the reactor or reactors. It is well known in the literature that high molecular weight polymers and polymers with widely different viscosities are difficult to mechanically blend. These problems are avoided if the polymer chains are mixed on a molecular level during the polymerization process using mixed catalysts.

Because late transition metal catalysts respond differently to reactor conditions than either metallocene or traditional Ziegler-Natta catalysts, the mixed catalysts of this invention offer novel opportunities to control the molecular weight distribution and composition distributions of polymer blends. The ability to select the proper reactor conditions requires an identification and understanding of the behavior of late transition metal catalysts in the presence of other transition metal catalysts. In this regard, we have found that surprising synergies exist between the catalyst components of the catalyst mixtures of this invention which lead to unexpected responses to catalyst reactor conditions and to novel and useful polymer products.

We have found that there are distinct differences between late transition metal catalysts and metallocene or Ziegler-Natta catalysts in how they respond to changing reactor conditions. For example, late transition metal catalysts show dramatic changes in the branch contents of their polymers as the reactor temperature changes (see examples P1-3 through P1-5). In contrast, metallocene or Ziegler-Natta catalysts show much smaller changes in branch content (since branch content relies on comonomer incorporation) as the reactor temperature changes. Likewise, branch contents in polymers made from late transition metal catalysts are much more dependent on ethylene pressure or concentration (see examples P4-1 through P5-5) than transition metal metallocene or Ziegler-Natta catalysts. Furthermore, we have also shown that the presence of comonomer has a much smaller effect on branch content in late transition metal catalysts (see examples P3-1 vs.P3-3 and P3-2 vs.P3-4 in copending U.S. application Ser. No. 60/020095, filed Jun. 17, 1997 than in transition metal metallocene or Ziegler-Natta catalysts.

We have also found that late transition metal catalysts, are unexpectedly insensitive to chain transfer agents such as $H_2$, silanes, isopropanol, etc. (See data in Examples P1-1, P1-2, P1-3, PC-8,P6-1 through P6-3, P6-4, P8-2 and P7-3). Traditional Ziegler-Natta and metallocene catalysts on the other hand are known in the literature to have strong sensitivities to these chain transfer agents. In fact, $H_2$ is often used in commercial reactors to control the molecular weight of the polymeric products. For catalyst systems that use alcohols such as isopropanol as the chain transfer agent, an alumoxane or other organoaluminum activator must be included as a component. Because of the different responses of the catalysts to $H_2$ and other chain transfer agents, a novel method to control molecular weight distributions is possible for the mixed catalysts of this invention. Reactor conditions are chosen to give the desired molecular weights from the late metal components of the mixture, and chain transfer agents are used to adjust the molecular weights of the metallocene and conventional Ziegler-Natta catalysts.

Figure 2:
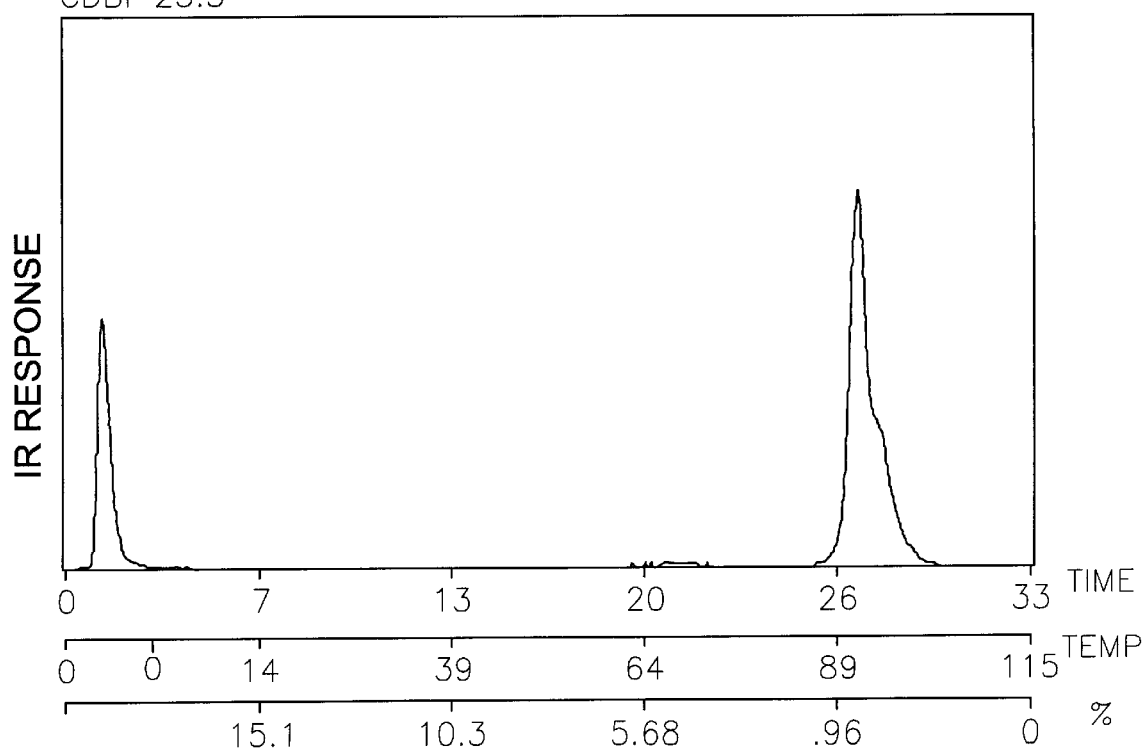

Often the molecular weight and composition distributions of the polymer blends are surprising. Comonomer composition distribution curves were determined by TREF methods for the batch polymerization examples shown in Table VIA where their characteristic data are presented. Clearly distinguishable peaks assignable to the late transition metal catalysts or metallocenes were observed in all cases as illustrated in FIGS. 1 and 2 which show the traces from examples P2-2 and P2-3, respectively. Comparatives PC-1 and PC-2 show that the metallocene catalysts produce 2% highly branched (non-crystallizing) polymer. Clearly, the left peaks (low temperature elution) are assignable to the late transition metal catalysts (c.f. PC-3) and the high temperature eluting polymer to the metallocene catalysts. Examples P2-1 and P2-2 illustrate the unpredictable behavior of mixed catalyst systems. Data from the individual component catalyst PC-3 leads one to expect that 22% of the isolated polymer from contacting mixed catalyst S-6 with ethylene (Ex P2-1, no hexene) would arise from TM-4 (29 mol % of the active transition metal compounds) since 3.14 mmol Ni×0.65 g PE/mmol Ni=2.0 g or 22% of the observed 9.2 g yield. However, TREF reveals only 6%. In addition, catalyst S-7 uses different ratios of TM-4 to TM-5 (94% TM-4) and a much smaller ratio of calculated to observed values of Ni derived polymer (46% to 29%) results. Examples P2-4 and P2-6 reveal similar unpredictability when different ratios of TM-4 and TM-6 are used (S-8, S-9). Large differences in the observed ratios of polymer components are also seen when comparing ethylene/hexene copolymerizations to ethylene homopolymerizations (cf., P2-2 vs. P2-3, P2-4 vs. P2-5, P2-6 vs. P2-7) for different catalyst pairs. The data illustrate that the polymer composition from mixed catalysts cannot be simply predicted from the behavior of the individual components.

In Example M1, a metallocene is mixed with a low $M_w$/oligomer-producing Ni catalyst and the resulting polymer product has only one peak in the GPC with $M_w$=121,000. The same metallocene run alone in comparative Example C1 gave a $M_w$=57,000. The presence of the Ni catalyst not only increased the $M_w$ capability of the metallocene in a surprising way, but also the presence of ethyl branching in the polymer product suggests that the oligomers generated by the Ni catalyst were incorporated by the metallocene. Other low $M_w$ late transition metal catalysts can be selected (eg. at least one R on E is phenyl or meta- and/or para-substituted phenyl) in order to enhance this synergistic effect.

Examples M2 and M3 provide evidence that this effect also occurs for vinyl or vinylidene terminated macromers that are produced by the late transition metal catalyst. In comparative example C1, the polymer produced by pure metallocene TM-8 was characterized with 0.24 long chain branches per molecule with a g' value of 0.96 relative to pure linear polyethylene. In examples M2 and M3, this same metallocene was run with Ni catalyst TM-7 with two different catalyst ratios. The mixed catalyst systems produced blends with increased long chain branching (0.65 and 0.72 long chain branches per molecule) and decreased g' values (0.89 and 0.88 relative to pure linear polyethylene) in comparison to the polymer produced by metallocene TM-8 alone. The increased long chain branching of these polymers and blends will give them improved processing and rheological properties.

Example M9 demonstrates that the enhanced $M_w$ capability induced by mixed catalysts can result from mixing two different late transition metal catalysts (the low $M_w$/oligomer-producing catalyst TM-7 and the high $M_w$ catalyst TM-11) and that the effect also works for propylene polymerizations. The catalyst mixture produced a monomodal polymer product with $M_w$=504,000 in comparison to the polymer produced by TM-11 alone with $M_w$=162,000 (measured in comparative Example C9). In Example M7, the late transition metal catalyst TM-2 is mixed with a traditional Ziegler-Natta catalyst S-12. The properties of the polymers made from the catalyst systems alone were determined in comparative Examples C7 and C8. The mixture gives two $M_w$ peaks in its GPC data corresponding to 10,700 (compared with 13,000 in Example C7) and 191,000 (compared with 86,000 in Example C8). Surprisingly, the $M_w$ of one catalyst's polymer went down in the mixture while the $M_w$ of the other catalyst's polymer went up.

The polymer blends made using the mixed catalysts of this invention can have advantageous properties over single polymer components. For example, U.S. Pat. Nos. 5,382,630 and 5,382,631 teach that a blend of a high molecular weight, high comonomer content ethylene/α-olefin copolymer with a low molecular weight low comonomer content ethylene/α-olefin copolymer is superior in many properties to a single component ethylene/α-olefin copolymer whose molecular weight and comonomer content are equal to the average values of the blend. Using mixed late transition metal and metallocene or Ziegler-Natta catalysts, we can obtain this distribution of polymer chains in a single reactor. Catalysts and conditions can be chosen so that the metallocene or Ziegler-Natta catalyst makes low molecular weight chains containing few branches while the late transition metal catalyst makes high molecular weight branched polymers which behave like they have high comonomer concentrations.

In a variation of the above strategy, transition metal catalyst components and reactor conditions could be chosen to give a blend of polymer products having similar molecular weights but differing compositions. Preferably, the metallocene or Ziegler-Natta catalyst would make chains containing few comonomers while the late transition metal catalyst would make branched chains. In this case, the molecular weight distribution would be narrow but the composition distribution would be broad. This type of polymer product is produced by catalyst mixtures S-8 and S-9 in examples P2-4 through P2-7. In all four examples, the molecular weight distribution of the resulting polymer is fairly narrow (2.31–4.19) while the composition distributions are clearly broad.

In another embodiment of the invention, U.S. Pat. Nos. 5,281,679 and 5,359,015 show that improved melt processing and flow characteristics are observed for broadened molecular weight distribution polymer blends produced in the reactor by using a mixture of catalysts that produce a range of polymer molecular weights. Examples M2 through M5 produce this type of blend. TM-7 is a late transition metal catalyst which produces relatively low molecular weights. In these examples, TM-7 is mixed with either a metallocene or another late transition metal catalyst which have a range of molecular weight capabilities independently. The resulting molecular weight distributions are very broad: 35.3, 12.2, 103, and 25.3.

Similarly, propylene and α-olefin feeds could be polymerized by a mixed catalyst system into highly desireable polymer blends. For example, a mixed catalyst system could be chosen such that a single reactor polymerization of an α-olefin would produce a mixture of high MW, stereoregular polyolefin, such as isotactic polypropylene (from the metallocene or Ziegler-Natta catalyst component), and an atactic polymer (from the late transition metal catalyst component) resembling an ethylene/α-olefin copolymer. Depending on the relative amounts of product from each of the catalysts, the product could be a thermoplastic olefin (TPO: 6–13 mol % polymer from the late metal catalyst), an impact copolymer (ICP: 13–30 mol % polymer from the late metal catalyst), or a thermoplastic elastomer (TPE: 30–60 mol % polymer from the late transition metal catalyst). In examples M7 and M8, isotactic polypropylene is produced by the Toho Ziegler-Natta catalyst (S-12) and metallocene (TM-8) catalysts, respectively, while the late transition metal catalyst (TM-2) makes polymers resembling ethylene/propylene copolymers with 36 and 65 mol % equivalent ethylene concentrations, respectively.

The broadened molecular weight distribution polymer products are produced from the mixed catalyst system comprising a late transition metal catalyst system and either a transition metal metallocene catalyst system or a different late transition metal catalyst system. The broadened molecular weight distribution polymer produced from the mixed transition metal catalyst system of this invention preferably has the weight average molecular weight of the polymer fraction produced from the late transition metal catalyst system from about 0.5 to 2.2 times greater than the weight average molecular weight of the polymer fraction produced from the different catalyst system, even more preferably from about 0.5 to 2 times greater and most preferably from about 0.5 to 1.75 times greater.

Bimodal polymer products are produced from the mixed catalyst system comprising a late transition metal catalyst system and either a transition metal metallocene catalyst system or a different late transition metal catalyst system. The bimodal polymer produced from the mixed transition metal catalyst system of this invention preferably has the weight average molecular weight of the polymer fraction produced from the late transition metal catalyst system from about 1.5 to 25 times greater than the weight average molecular weight of the polymer fraction produced from the different catalyst system, even more preferably from about 1.5 to 15 times greater and most preferably from about 1.5 to 10 times greater.

Polymodal molecular weight distribution polymers may be produced by using a mixed catalyst system comprising a late transition metal catalyst system and either a Ziegler-Natta catalyst system; or by using a mixed catalyst system comprising a late transition metal catalyst system and a mixture of more than one different catalyst system; or by using a mixed catalyst system comprising a late transition metal catalyst system and transition metal metallocene catalyst system or a different late transition metal catalyst system and by varying the profile of the reactor (e.g. varying temperature, ethylene concentration, chain transfer concentration and the like) or by using series reactors; or combinations thereof.

The molar ratio of the polymer fractions produced from the mixed transition metal catalyst system may also vary. The molar ratio of the polymer fraction produced from the late transition metal catalyst to the polymer produced from the different catalyst system is preferably from about 99:1 to 1:99, more preferably from about 90:10 to 1:99, even more preferably from about 25:75 to 1:99, and most preferably from about 10:90 to 1:99. When the monomer feed is propylene and the second catalyst component is capable of producing crystalline polypropylene, the most preferred molar ratios of the polymer fraction produced from the late transition metal catalysts system to the polymer produced for the different catalyst system is preferably from about 3:97 to 18:82, and more preferably from 6:94 to 13:87 for the formation of thermoplastic olefins; preferably from about 10:90 to 35:65, and more preferably from 13:87 to 30:70 for the formation of impact copolymers; and preferably from about 25:75 to 65:35, and more preferably from 30:70 to 60:40 for the formation of thermoplastic elastomers.

In one embodiment of the invention, when the polymer product molecular weight distribution is broadened or bimodal, the composition distribution breadth index of the polymer may be narrow with the preferred composition distribution breadth index being from about 70% to 100%, more preferably from about 80% to 100% and most preferably between 85% and 100% with values above 80% being most preferred.

In another embodiment of the invention, when the polymer product molecular weight distribution is broadened or bimodal, the composition distribution breadth index of the polymer may be orthogonally broad, meaning that the higher molecular weight polymer fraction will have a higher branching content and the lower molecular weight polymer fraction will have a lower branching content. These polymers preferably have composition distribution breadth index from about 25% to 85%, more preferably from about 40% to 85%, and most preferably from about 50% to 85%.

Still in another embodiment of the invention, the polymer molecular weight distribution produced from the mixed catalyst system is narrow and the composition distribution breadth index is broad. The preferred molecular weight distributions is from about 1.5 to 4.5, more preferably from about 2.0 to 3.5 and most preferably from about 2.0 to 3.0. The polymer composition distribution breadth index is preferably from about 25% to 85%, more preferably from about 40% to 85%, and most preferably from about 50% to 85%.

When the late transition metal catalyst system is chosen to produce α-olefins and the different catalyst component is a transition metal metallocene catalyst system or Ziegler-Natta catalyst system, the preferred olefin composition is from about $C_4$ to $C_{30}$, more preferably from about $C_4$ to $C_{20}$ and most preferably from $C_4$ to $C_{10}$. Depending on the ratio of the two catalyst systems used, the amount of comonomer incorporation can be from about 90 mole % to 1 mole %, with from about 50 mole % to 1 mole % being more preferred, and from about 30 mole % to 1 mole % being most preferred.

When the late transition metal catalyst system is chosen to produce vinyl and vinylidene terminated macromers and the different catalyst component is a transition metal metallocene catalyst system, Ziegler-Natta catalyst system or a late transition metal catalyst system, the preferred olefin composition of the macromer is from about $C_{30}$ to $C_{1000}$, more preferably from about $C_{50}$ to $C_{800}$ and most preferably from $C_{100}$ to $C_{500}$ Depending on the ratio of the two catalyst systems used, the amount of macromer incorporation can be from about 100 branches/1000C to 0.005 branches/1000C, with from about 10 branches/1000C to 0.01 branches/1000C being more preferred, and from about 3 branches/1000C to 0.01 branches/1000C being most preferred. Additionally, it is most preferred that the polymer produced has a g' of 0.95 or less with respect to linear polyethylene.

EXAMPLES

The following examples for polymerization methods 1–8 were conducted with catalyst systems derived from the below listed complexes of Table I.

TABLE I

Transition Metal Precursor Structures.

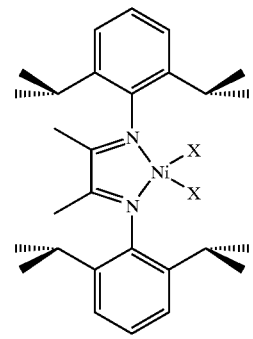

TM-1, X = Cl
TM-2, X = Br
TM-3, X = Me

TABLE I-continued

Transition Metal Precursor Structures.

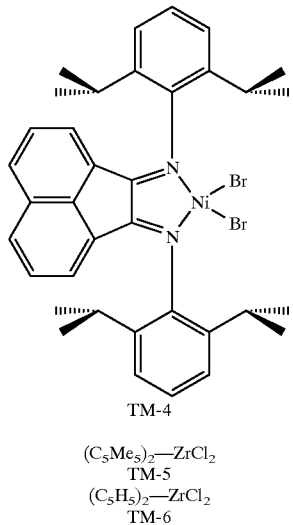

TM-4

$(C_5Me_5)_2$—$ZrCl_2$
TM-5
$(C_5H_5)_2$—$ZrCl_2$
TM-6

The examples below illustrate both heterogeneous and homogeneous polymerization using catalyst systems in accordance with the invention. The methods of preparing the supported catalysts for the heterogeneous processes is described. Examples of for gas phase polymerization, slurry polymerization and solution are presented.

General Supporting Method

An aluminoxane, such as methylalumoxane or modified alumoxane, or other suitable activator such as $Al(CH_3)_3$, $Al(CH_2CH_3)_2Cl$, $B(C_6F_5)_3$, $[C_6H_5NMe_2H]^+[B(C_6F_5)_4]^-$, $[(C_6H_5)_3C]^+[B(C_6F_5)_4]^-$, $[H]^+[BF_4]^-$, $[H]^+[PF_6]^-$, $[Ag]^+[BF_4]^-$, $[Ag]^+[PF_6]^-$, or $[Ag]^+[B(C_6F_5)_4]^-$ is combined with one or more trans metal complexes in an appropriate solvent to form a precursor solution. A suitable support, preferably porous, is charged to a vessel and the precursor solution is added with stirring. The mixture may be mixed by hand with a spatula, by a rotating stirrer with wire loops such as a Kitchen Aid dough mixer, by metal blades rotating at high speed such as in a Wehring blender, by a helical ribbon bladed mixer, by shaking, tumbling, fluidized bed mixing, by paddle or propeller blades on a rotating stir shaft, or other appropriate means. The total amount of solvent used to form the precursor suspension or solution may be less than the pore volume of the support as in impregnation to incipient wetness, or greater than the pore volume of the support such that a slurry is formed, or an amount in between such that a solution-finely divided support mixture is neither free flowing nor a slurry. Solution may be added to support or vice versa as appropriate to the mixing method. If desired the liquids may be removed by purging with an inert gas or under vacuum.

Support Method

An aluminoxane or suitable activator was combined with the transition metal complexes in toluene to form a precursor solution. The solution was charged to a vessel and the porous support added all at once and the mixture stirred by hand with a spatula. The total volume of the precursor solution was greater than the pore volume of the support, but not enough to reach the point of gelation or form a slurry, about 100%–200% pore volume. The solvent was removed in vacuo (press. <200 mTorr) and ambient temperature overnight, about 12–16 hr.

TABLE II

Supported Catalyst Preparation Data.

| Example | Method | TM used | TM mg | MAO g | Tol. g | $SiO_2$ g | P.V. soln.* |
|---|---|---|---|---|---|---|---|
| S-1 | 1 | TM-1 | 88 | 3.9 | 1.8 | 3.0 | 1.3 |
| S-2 | 1 | TM-2 | 106 | 3.9 | 1.8 | 3.0 | 1.3 |
| S-3 | 1 | TM-4 | 118 | 3.9 | 1.8 | 3.0 | 1.3 |
| S-4 | 1 | TM-4 | 1200 | 38.1 | 38.9 | 30.0 | 1.7 |
| S-5 | 1 | TM-4 | 1200 | 38.1 | 38.9 | 30.0 | 1.7 |
| S-6 | 1 | TM-4/TM-5 | 100/150 | 3.9 | 1.8 | 3.0 | 1.7 |
| S-7 | 1 | TM-4/TM-5 | 128/5 | 3.9 | 3.6 | 3.0 | 1.7 |
| S-8 | 1 | TM-4/TM-6 | 125/9 | 3.9 | 3.6 | 3.0 | 1.7 |
| S-9 | 1 | TM-4/TM-6 | 72/20 | 3.9 | 3.6 | 3.0 | 1.7 |
| S-10 | 1 | TM-6 | 480 | 37.3 | 40.0 | 30.0 | 1.7 |
| S-11 | 1 | TM-5 | 129 | 6.05 | 2.8 | 5.1 | 1.2 |

*P.V. = Pore Volume.

The aluminoxane used was 30 wt % methyl aluminoxane supplied in toluene by Albemarle. The silica was MS948 (1.6 cc/g P.V. (P.V.=Pore Volume), Davison Chemical Co) previously heated 600° C. under $N_2$ for 3 hours, and the toluene was air and moisture free from Exxon Chemical.

Method 1: Continuous Fluidized Bed Gas Phase Polymerizations

Under conditions described in copending U.S. application Ser. No. 08/466,547, filed Jun. 6, 1995, and in WO 96/00245, a continuous cycle fluidized bed gas phase polymerization reactor was used for the ethylene polymerization studies summarized in Tables III and IV. The approximate dimensions of the reactor section above the distributor plate and below the disengaging head were 4 in. (10.2 cm.) in diameter and 24 in. (61.0 cm.) in length. Total operating pressue was 314.7 psia (2170 kPa) (gas compositional makeup described in Table II with the balance being $N_2$) and polymer samples were collected after several bed turnovers. Detailed process descriptions are given in Table III and product characterization data in Table IV.

Method 2: Semi Batch Slurry Polymerizations

Conditions of the polymerization examples are given in Table V. Polymerizations were performed in 400 mL of dry hexane in a nitrogen purged 1 L Zipperclave reactor (Autoclave Engineers) equipped with an external temperature control jacket. In a glove box a charge of the supported catalyst, usually 50 to 200 mg, was loaded into a short length of SS tubing between two ball valves and backed by a small bomb containing 20 mL dry hexane. This device was attached to the reactor under an $N_2$ purge. Unless noted otherwise, cocatalyst (0.200 mL 25 wt % triethylaluminum in heptane) was injected into the reactor with comonomer if noted and the mixture heated to operating temperature with stirring. Stirring was stopped and the catalyst flushed into the reactor by the hexane backed with ethylene or nitrogen pressure. Stirring was immediately restarted while the reactor reached its regulated operating pressure corrected for solvent vapor pressure.

After sufficient reaction occurred the reactor was vented and the contents slowly poured into a beaker with 1 L of stirred acetone under air and filtered. Alternately the solvent could be removed under vacuum or by an impinging nitrogen stream. The separated polymer samples were then dried over night in a vacuum drying oven at about 50° C.

FIGS. 1 and 2 contain CD traces of the single component polymers produced in examples P2-2, and P2-3 of Table V. Polymerizations P2-1 through P2-7 utilized mixed catalysts. The CD traces of the polymer clearly demonstrate that two distinct polymer components were produced, the high temperature eluting component assignable to the metallocene and the low temperature peak to the late transition metal catalyst as shown in FIGS. 1 and 2. Increasing the amount of comonomer reduced the elution temperature of the metallocene derived peak consistent with increased branch content. Additionally the area of the high temperature peak increased indicating increased activity of the metallocene relative to the late transition metal complex. Decreasing the relative loading of the metallocene resulted in a more equal distribution under the same conditions.

Method 3: Semi Batch Solution/Suspension Polymerizations in Hexane

Polymerizations were performed as in Method 2 with the following exceptions. No triethylaluminum was used. Instead 10 wt % methyl aluminoxane in toluene from Witco was introduced into the reactor as both scavenger and activator. The transition metal compounds were introduced into the reactor as solutions in toluene although other solvents such as difluorobenzene and methylene chloride could be used.

Method 4: Semi Batch Solution/Suspension Polymerizations in Toluene

This is the method of method 3 above except that toluene was used as the polymerization solvent. When the late transition metal complex used was TM-2, 1,2-difluoro benzene was used as the solvent to make the catalyst solution.

Method 5: Semi Batch Solution/Suspension Polymerizations of Brookhart

This is the method of the comparative examples disclosed in Brookhart, et al., supra. The polymerization data of Brootchart as shown in Tables VII and VIII teaches that polymer molecular weight and yield are independent of ethylene pressure. However, examples P4-1 through P4-5 show distinct differences in yield and molecular weight with differences in pressure.

Method 6: Semi Batch MAO Activated Solution/Suspension Polymerizations in Toluene with Polymerization Modifiers Conditions of the polymerization examples are given in Table IX. This is the method of method 3 above except that the indicated number of micromoles of polymerization modifier such as isopropanol was introduced into the reactor prior to the addition of catalyst.

The examples provided in Tables III, IV, IX and X show that the Mw of polymers produced by the catalyst of the invention are not affected by the presence of silanes or hydrogen. These are well know to reduce molecular weight in traditional coordination polymerization catalysts, ( see for example Marks, JACS 1995, 117, 10747 and references therein), thus it is possible to control the molecular weight of the latter polymer components independently of the late transition metal polymer components.

Method 7: Semi Batch Noncoordinating Anion (NCA) Activated Solution/Suspension Polymerizations in Toluene with Polymerization Modifiers Conditions of the polymerization examples are given in Table XI. This is the method of method 6 above except that a noncoordinating anion, in this case [PhNMe$_2$H$^+$] [B(C$_6$F$_5$)$_4$$^-$], rather than methylalumoxane was used to activate the late transition metal complex before addition to the reactor. These reactions were carried out in a 500 mL autoclave in 200 mL toluene.

It is useful, especially in operating a commercial plant, to have reagents that can terminate a polymerization reaction. Our studies indicated that Catechol borane effectively suppressed polymerization activity. Trimethoxysilane substantially prevented polymerization activity. See Table IX.

Method 8: Semi Batch Noncoordinating Anion (NCA) Activated Solution/Suspension Polymerizations in Toluene with Polymerization Modifiers and Scavenger Conditions of the polymerization examples are given in Table XI. This is the method of method 7 above except that additionally 10 μL of a solution of 25 wt. % triisobutylaluminum in heptane was added to the reactor.

The presence of both trimethoxy silane and isopropanol reduced the molecular weight of the resulting polymers, additionally isopropanol did not reduce polymerization activity. Also, the addition of triisobutylaluminum substantially increased polymer yield. See Tables XI and XII.

TABLE III

Polymerization Method 1 Process Conditions.

| Example | Catalyst | C$_2$ mol % | H$_2$/C$_2$[1] | ° C. | Bed Turnovers[2] | g PE/g Cat |
|---|---|---|---|---|---|---|
| P1-1 | S-4 | 60.4 | 0.1 | 39.2 | 2.7 | 228 |
| P1-2 | ※ | 62.1 | 1.4 | 41.6 | 5.0 | 344 |
| P1-3 | S-5 | 69.4 | 14.6 | 43.5 | 2.8 | 343 |
| P1-4 | ※ | 70.2 | 14.8 | 54.5 | 4.1 | 367 |
| P1-5 | ※ | 70.4 | 19.8 | 63.0 | 3.1 | 296 |

[1]mol ppm H$_2$/mol % C$_2^-$ (ideal gas behavior assumed for ethylene)
[2]Number of times the starting polymer bed displaced.
[3]Productivity based upon material balance of catalyst fed into reactor and polymer removed.

TABLE IV

Polymerization Method 1 Product Data.

| Ex. | Catalyst | Density | Melt Index[1] | MP ° C. | Branch $^1$H NMR[2] | M$_w$[3] 10$^3$ | MWD |
|---|---|---|---|---|---|---|---|
| P1-1 | S-4 | 0.9107 | no flow | 117.2 | 18.4 | 564 | 2.77 |
| P1-2 | ※ | 0.9105 | no flow | nm | 20.4 | 665 | 2.70 |
| P1-3 | S-5 | 0.9103 | no flow | 118.86 | 19.6 | 590 | 2.80 |
| P1-4 | ※ | 0.9061 | no flow | 115.9 | 26.5 | 525 | 2.86 |
| P1-5 | ※ | 0.9013 | no flow | 91.0 | 33.6 | 525 | 2.68 |

[1]No significant flow under standard ASTM melt indexer conditions.
[2]Methyl groups per 1000 carbons
[3]Samples showed some mass loss during GPC analysis.
nm = not measured

TABLE V

Batch Slurry Polymerization Process Data (Method 2).

| Ex | Cat. | Method | C$_2^-$ psi | ° C. | min | Cat mg[1] | TM-A μmol | TM-B μmol | activ./ μmol | activ./ TM1[2] | activ./ TM2[2] | Yield g | g PE/ g cat.[3] | C$_6^-$ mL |
|---|---|---|---|---|---|---|---|---|---|---|---|---|---|---|
| PC-1 | S-11 | 2 | 60 | 75 | 30 | 50 | 2.13 | 0.00 | 223 | 104 | — | 9.7 | 194 | 45 |
| PC-2 | S-10 | 2 | 60 | 75 | 30 | 200 | 7.88 | 0.00 | 902 | 115 | — | 13.2 | 66 | 45 |
| PC-3 | S-4 | 2 | 60 | 75 | 60 | 200 | 7.64 | 0.00 | 920 | 120 | — | 5.6 | 28 | 0 |
| PC-4 | S-5 | 2 | 60 | 75 | 30 | 200 | 7.83 | 0.00 | 902 | 115 | — | 5.1 | 26 | 0 |

TABLE V-continued

Batch Slurry Polymerization Process Data (Method 2).

| Ex | Cat. | Method | $C_2^=$ psi | °C. | min | Cat mg[1] | TM-A μmol | TM-B μmol | activ./ TM1[2] | activ./ TM2[2] | activ./ TM2[2] | Yield g | g PE/ g cat.[3] | $C_6^=$ mL |
|---|---|---|---|---|---|---|---|---|---|---|---|---|---|---|
| P2-1 | S-6 | 2 | 60 | 75 | 30 | 100 | 3.24 | 0.81 | 460 | 142 | 569 | 9.2 | 92 | 0 |
| P2-2 | S-7 | 2 | 60 | 75 | 30 | 200 | 8.07 | 0.54 | 917 | 114 | 1708 | 11.6 | 58 | 0 |
| P2-3 | S-7 | 2 | 60 | 75 | 30 | 200 | 8.07 | 0.54 | 917 | 114 | 1708 | 7.4 | 37 | 45 |
| P2-4 | S-8 | 2 | 60 | 75 | 30 | 200 | 8.07 | 1.43 | 916 | 114 | 641 | 10.2 | 51 | 0 |
| P2-5 | S-8 | 2 | 60 | 75 | 30 | 200 | 8.07 | 1.43 | 916 | 114 | 641 | 1.9 | 10 | 45 |
| P2-6 | S-9 | 2 | 60 | 75 | 30 | 200 | 4.68 | 3.68 | 924 | 197 | 251 | 8.8 | 44 | 0 |
| P2-7 | S-9 | 2 | 60 | 75 | 30 | 200 | 4.68 | 3.68 | 924 | 197 | 251 | 5.3 | 27 | 45 |

PC-X = Polymerization Comparative X; TM = transition metal; PE = polyethylene; $C_2^=$ = ethylene; $C_6^=$ = hexene; activ. = activator.
[1]Amount of supported catalyst added to reactor.
[2]Unless noted the activator is MAO and activ./TM is the ratio of Al to TM based on the Al analysis of the MAO.
[3]Grams polyethylene per gram supported catalyst or g transition metal complex.

TABLE VI

Batch Slurry Polymerization Characterization Data (Method 2).

| Ex | Cat. | Method | MW ×10⁻³ | MWD | ¹H NMR[1] | ¹³C NMR[2] | FTIR[3] | hexene mL |
|---|---|---|---|---|---|---|---|---|
| PC-1 | S-11 | 2 | 494 | 5.46 | | | 0.1 | 45 |
| PC-2 | S-10 | 2 | 94 | 2.95 | | | 14.0 | 45 |
| PC-3 | S-4 | 2 | 96 | 2.30 | | 88.8 | | 0 |
| PC-4 | S-5 | 2 | 76 | 1.94 | 80.1 | | | 0 |
| P2-1 | S-6 | 2 | 357 | 2.90 | | 1.2 | | 0 |
| P2-2 | S-7 | 2 | 365 | 2.60 | 29.6 | | | 0 |
| P2-3 | S-7 | 2 | | | | | | 45 |
| P2-4 | S-8 | 2 | 243 | 2.31 | 65.8 | | | 0 |
| P2-5 | S-8 | 2 | 199 | 4.19 | 30.0 | | | 45 |
| P2-6 | S-9 | 2 | 226 | 3.03 | 17.3 | | | 0 |
| P2-7 | S-9 | 2 | 123 | 4.11 | 18.5 | | | 45 |

C-X = Polymerization Comparative X; TM = transition metal; PE = polyethylene; $C_2^=$ = ethylene; $C_6^=$ = hexene; activ. = activator.
[1]Me groups per 1000 carbons.
[2]Branches per 1000 carbons.
[3]Branches per 1000 carbons.

TABLE VI

A Batch TREF Data and Analysis.

| | | | First Peak | | Second Peak | | Yield PE g | μmol Ni | μmol MCN | g PE/ Ni Obs. | Predicted PE from Ni g | Predicted PE from MCN[4] g | g PE/ μmol MCN[5] | % PE from Ni Calcd[6] | % PE from Ni Obs. TREF | % TM as Ni[7] | $C_6^=$ mL |
|---|---|---|---|---|---|---|---|---|---|---|---|---|---|---|---|---|---|
| EX | Cat. | TM | % Area[1] | max[2] °C. | % Area[1] | max[2] °C. | shape[3] | | | | | | | | | | |
| PC-1 | S-11 | 5 | 0% | — | 99% | 85.4 | n | 9.7 | 0.00 | 2.13 | 4.55 | | | | | | 45 |
| PC-2 | S-10 | 6 | 2% | 0.0 | 98% | 71.0 | br | 13.2 | 0.00 | 7.88 | 1.68 | | | | | | 45 |
| PC-3 | S-3 | 4 | 96% | 0.0 | 0% | — | — | 5.6 | 7.65 | 0.00 | | | | | | | 0 |
| PC-4 | S-4 | 4 | — | — | — | — | — | 5.1 | 7.83 | 0.00 | 0.65 | | | | | | 0 |
| P2-1 | S-6 | 4/5 | 6% | 0.0 | 91% | 92.5 | m | 9.2 | 3.14 | 7.84 | | 2.0 | 7.2 | 0.91 | 22% | 6% | 29% | 0 |
| P2-2 | S-7 | 415 | 29% | 0.0 | 71% | 96.1 | m | 11.6 | 8.24 | 0.54 | | 5.4 | 6.2 | 11.5 | 46% | 29% | 94% | 0 |
| P2-3 | S-7 | 4/5 | 26% | 0.0 | 73% | 92.5 | n | 7.4 | 8.24 | 0.54 | | | | | | 26% | 94% | 45 |
| P2-4 | S-8 | 4/6 | 71% | 0.0 | 27% | 92.5 | m | 10.2 | 8.19 | 1.43 | | 5.3 | 4.9 | 3.40 | 52% | 71% | 85% | 0 |
| P2-5 | S-8 | 4/6 | 47% | 0.0 | 53% | 88.9 | br | 1.9 | 8.19 | 1.43 | | | | | | 47% | 85% | 45 |
| P2-6 | S-9 | 4/6 | 15% | 0.0 | 83% | 92.5 | m | 8.8 | 4.68 | 3.68 | | 3.0 | 5.8 | 1.56 | 35% | 15% | 56% | 0 |
| P2-7 | S-9 | 4/6 | 9% | 0.0 | 91% | 74.6 | br | 5.3 | 4.68 | 3.68 | | | | | | 9% | 56% | 45 |

MCN = metallocene compound.
[1]Percent of total signal area;
[2]Elution temperature of maximum signal intensity in peak
[3]n = narrow, br = broad, m = multiple maxima.
[4]Predicted PE from MCN = Yield PE - Predicted PE from Ni.
[5]g PE/μmol MCN = Predicted g PE from MCN divided by μmol MCN in cat charge.
[6]% PE from Ni Calcd. = Predicted g PE from Ni/(Predicted PE from Ni - Predicted PE from MCN)
[7]From catalyst preparation data.

TABLE VII

Batch Solution Polymerization Process Examples.

| Ex | Cat. | Method | C₂⁼ psi | °C. | min | Cat mg[1] | TM1 µmol | activ./ µmol | activ./ TM1[2] | Yield g | Ratio: g PE to g cat.[3] |
|---|---|---|---|---|---|---|---|---|---|---|---|
| PC-5 | TM-4 | 5 | 14.7 | 0 | 30 | — | 0.83 | 1532 | 1837 | 2.2 | 3667 |
| PC-6 | TM-4 | 5 | 58.8 | 0 | 30 | — | 0.83 | 1532 | 1837 | 2.1 | 3500 |
| PC-7 | Th-4 | 5 | 14.7 | 25 | 30 | — | 0.83 | 1532 | 1837 | 1.8 | 3000 |
| P4-1 | TM-2 | 4 | 40 | 60 | 30 | — | 1.00 | 1532 | 1532 | 3 | 4839 |
| P4-2 | TM-2 | 4 | 80 | 60 | 30 | — | 1.00 | 1532 | 1532 | 6.6 | 10645 |
| P4-3 | TM-2 | 4 | 120 | 60 | 30 | — | 1.00 | 1532 | 1532 | 9.4 | 15161 |
| P4-4 | TM-2 | 4 | 200 | 60 | 30 | — | 1.00 | 1532 | 1532 | 11.5 | 18548 |
| P5-5 | TM-2 | 4 | 280 | 60 | 30 | — | 1.00 | 1532 | 1532 | 12.5 | 20161 |

PC-X = Polymerization Comparative X; TM = transition metal; PE = polyethylene; C₂⁼ = ethylene; C₆⁼ = hexene; activ. = activator.
[1]Amount of supported catalyst added to reactor.
[2]Unless noted the activator is MAO and activ./TM is the ratio of Al to TM based on the Al analysis of the MAO.
[3]Grams polyethylene per gram supported catalyst or g transition metal complex.

TABLE VIII

Batch Polymerization Process Examples - Characterization Data.

| Ex | Cat. | Method | MW ×10⁻³ | MWD | ¹H NMR[1] | ¹³C NMR[2] | mp |
|---|---|---|---|---|---|---|---|
| PC-5 | TM-4 | 5 | 1600 | 2.4 | 24.0 | | 112 |
| PC-6 | TM-4 | 5 | 1400 | 2.3 | 5.0 | | 122 |
| PC-7 | TM-4 | 5 | 410 | 2.2 | 71.0 | | 39 |
| P4-1 | TM-2 | 4 | 397 | 3.3 | 92.7 | | |
| P4-2 | TM-2 | 4 | 353 | 2.3 | 79.7 | | |
| P4-3 | TM-2 | 4 | 543 | 2.5 | 71.4 | | |
| P4-4 | TM-2 | 4 | 553 | 2.6 | 59.6 | | |
| P5-5 | TM-2 | 4 | 557 | 2.7 | 55.1 | | |

PC-X = Polymerization Comparative X; TM = transition metal; PE = polyethylene; C₂⁼ = ethylene; C₆⁼ = hexene; activ. = activator.
[1]Me groups per 1000 carbons.
[2]Branches per 1000 carbons.
[3]Branches per 1000 carbons.

TABLE IX

Batch Solution/Suspension Polymerization Reaction Modifiers.

| Ex | Cat. | Method | Modifier | C₂⁼ psi | °C. | min | TM µmol | activ. µmol | acitv./ TM[2] | Mod./ µmol | Mod./ TM | Yield g | Ratio g PE to g cat.[3] |
|---|---|---|---|---|---|---|---|---|---|---|---|---|---|
| PC-8 | TM-4 | 6 | none | 75 | 60 | 30 | 0.99 | 1532 | 1543 | 0 | 0 | 19.5 | 27300 |
| P6-1 | TM-4 | 6 | Et₃SiH | 75 | 60 | 30 | 1.11 | 1532 | 1378 | 9 | 8 | 21.3 | 26625 |
| P6-2 | TM-4 | 6 | Et₃SiH | 75 | 60 | 30 | 1.11 | 1532 | 1378 | 86 | 77 | 23.4 | 29250 |
| P6-3 | TM-4 | 6 | Et₃SiH | 75 | 60 | 30 | 1.11 | 1532 | 1378 | 860 | 773 | 21.1 | 26375 |
| PC-9 | TM-4 | 6 | none | 75 | 60 | 30 | 2.78 | 1532 | 551 | 0 | 0 | 17.0 | 8500 |
| P6-4 | TM-4 | 6 | Et₃SiH | 75 | 60 | 30 | 2.78 | 1532 | 551 | 894 | 322 | 17.4 | 8700 |
| P6-5 | TM-4 | 6 | (MeO)₃SiH | 75 | 60 | 30 | 2.78 | 1532 | 551 | 900 | 324 | 0.0 | 0 |
| P6-6 | TM-4 | 6 | (MeO)₃SiH | 75 | 60 | 30 | 2.78 | 1532 | 551 | 900 | 324 | 2.7 | 1350 |
| P6-7 | TM-4 | 6 | catechol borane | 75 | 60 | 30 | 2.78 | 1532 | 551 | 901 | 324 | 0.0 | 0 |
| P6-8 | TM-4 | 6 | catechol borane | 75 | 60 | 30 | 2.78 | 1532 | 551 | 901 | 324 | 0.0 | 0 |
| P6-9 | TM-4 | 6 | isopropanol | 75 | 60 | 30 | 2.78 | 1532 | 551 | 90 | 32 | 18.9 | 9450 |

C-X = Polymerization Comparative X; TM = transition metal; PE = polyethylene; Mod. = Modifier; C₂⁼ = ethylene; C₆⁼ = hexene; activ. = activator.
[2]Unless noted the activator is MAO and activ./TM is the ratio of Al to TM based on the Al analysis of the MAO.
[3]Grams polyethylene per gram supported catalyst or g transition metal complex.

TABLE X

Batch Solution/Suspension Polymerization Characterization Data.

| Ex | Cat. | Method | modifier | MW ×10⁻³ | MWD | ¹H NMR¹ |
|---|---|---|---|---|---|---|
| PC-8 | TM-4 | 6 | none | 213 | 3.9 | nm |
| P6-1 | TM-4 | 6 | Et₃SiH | 219 | 2.4 | nm |
| P6-2 | TM-4 | 6 | Et₃SiH | 214 | 2.6 | nm |
| P6-3 | TM-4 | 6 | Et₃SiH | 222 | 2.5 | nm |
| PC-9 | TM-4 | 6 | none | 260 | 2.1 | 75.2 |
| P6-4 | TM-4 | 6 | Et₃SiH | 301 | 2.2 | 74.2 |
| P6-5 | TM-4 | 6 | (MeO)₃SiH | na | na | na |
| P6-6 | TM-4 | 6 | (MeO)₃SiH | 192 | 2.1 | 38.9 |
| P6-7 | TM-4 | 6 | catechol borane | na | na | na |
| P6-8 | TM-4 | 6 | catechol borane | na | na | na |
| P6-9 | TM-4 | 6 | isopropanol | 219 | 2.4 | 75.9 |

C-X = Polymerization Comparative X; TM = transition metal; PE = polyethylene; $C_2^=$ = ethylene; activ. = activator.
¹Me groups per 1000 carbons.

TABLE XI

Batch Solution/Suspension Polymerization Reaction Modifiers with NCAs.

| Ex | Cat. | Method | Modifier | $C_2^=$ psi | °C. | min | TM μmol | activ. μmol | activ/ TM | Mod./ μmol | Mod./ TM | Yield g | g PE/ g cat.¹ |
|---|---|---|---|---|---|---|---|---|---|---|---|---|---|
| P7-1 | TM-3 | 7 | none | 75 | 60 | | 10.1 | 15.0 | 1.49 | — | — | | |
| P8-1 | TM-3 | 8 | none | 75 | 60 | | 10.1 | 15.0 | 1.49 | — | — | | |
| P8-2 | TM-3 | 8 | isopropanol | 75 | 60 | | 10.1 | 15.0 | 1.49 | 1664 | 165 | | |
| P7-2 | TM-3 | 7 | none | 75 | 60 | | 30.4 | 44.9 | 1.48 | — | — | | |
| P7-3 | TM-3 | 7 | isopropanol | 75 | 60 | | 30.4 | 44.9 | 1.48 | 1664 | 55 | | |

C-C = Polymerization Comparative X; TM = transition metal; PE = polyethylene; Mol. = Modifier
$C_2^=$ = ethylene; $C_6^=$ = hexene; activ. = activator.
¹Grams polyethylene per gram supported catalyst or g transition metal complex.

TABLE XII

Batch Solution/Suspension Polymerization Characterization Data.

| Ex | Cat. | Method | modifier | MW × 10⁻³ | MWD | ¹H NMR¹ |
|---|---|---|---|---|---|---|
| P7-1 | TM-3 | 7 | none | nm | nm | nm |
| P8-1 | TM-3 | 8 | none | nm | nm | nm |
| P8-2 | TM-3 | 8 | isopropanol | nm | nm | nm |
| P7-2 | TM-3 | 7 | none | 343 | 2.6 | nm |
| P7-3 | TM-3 | 7 | isopropanol | 325 | 2.1 | nm |

C-X=Polymerization Comparative X; TM=transition metal; PE=polyethylene;
C₂=ethylene; C₆=hexene; activ.=activator.
¹Me groups per 1000 carbons.

Mixed Catalyst Examples

The polymerization run was performed in a 1-liter autoclave reactor equipped with a paddle stirrer, an external water jacket for temperature control, a regulated supply of dry nitrogen, ethylene, in addition to direct feed of propylene, 1-butene and hexane, and a septum inlet for introduction of other solvents or comonomers, transition metal compound and activator/cocatalysts. The reactor was dried and degassed thoroughly prior to use. The activators used included 10 wt. % methylalumoxane from Albemarle (A-1), 15 wt. % aluminum sesquichloride in hexane from Texas Alkyl (A-2), or 25 wt. % triethylaluminum (TEAL) in heptane from Akzo (A-3). The transition metal compounds used included vanadium oxide trichloride (TM-10), Toho 133, a classical Ziegler Natta polypropylene catalyst used with cyclohexylmethyldimethoxy-silane as an external donor (S-12), dimethylsilyl-bis(tetrahydroindenyl) zirconium dichloride (TM-8), dimethylsilyl (tetramethylcyclopentadienyl)(cyclododecylamido-titanium dichloride (TM-9), and the following Group 10 catalysts:

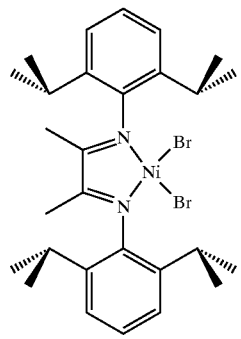

TM-2

-continued

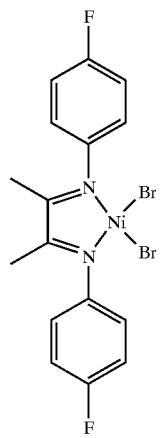

TM-7

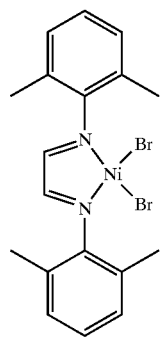

TM-11

A typical mixed catalyst run consisted of adding 400 ml of solvent or bulk monomer followed by activator and the reactor was equilibrated to the desired temperature. The transition metal compounds were then added. The non-supported metallocene compounds were added as a toluene solution. The Group 10 compounds were typically added as a methylene chloride solution. The supported catalysts were pushed into the reactor through a catalyst addition tube using high pressure nitrogen and/or about 10 ml of hexane. If ethylene was used, it was continuously fed at the differential pressure indicated. The polymerization reaction was limited to the indicated times. The reaction was ceased by rapidly cooling and venting the system. In some cases isopropyl alcohol was also added to the polymer sample. The solvent was evaporated off of the polymer by a stream of nitrogen and if needed, drying was finalized in a vacuum oven at 100° C. Data for the polymerizations and polymer analysis is recorded in Tables XIII, XIV, XV and XVI with supplemental information given below. Examples M1 to M6 and C1 to C5 are polymerization reactions using ethylene as the only added monomer feed. Examples M7 to M9 and C6 to C9 are polymerization reactions using propylene as the only added monomer feed.

Mixed Catalyst—Example M1

This example used a Group 10 catalyst (TM-7) to produce low molecular weight polymers/oligomers and a metallocene catalyst (TM-8) to produce higher molecular weight polymer. Standard polymerization conditions included the use of 400 ml of toluene as the solvent, 10 wt. % alumoxane as the activator, and 65 psid of ethylene continuously fed into the reactor. Due to the lower amount of TM-7 used, the molecular weight distribution of the polymer produced is relatively narrow, however, a low molecular weight tail is present. Only a small amount of ethyl branching was detected (0.2 mol %) via $^{13}$C NMR.

Mixed Catalyst—Example M2

This example used a Group 10 catalyst (TM-7) to produce low molecular weight polymers/oligomers and a metallocene catalyst (TM-8) to produce higher molecular weight polymer. Standard polymerization conditions included the use of 400 ml of toluene as the solvent, 10 wt. % alumoxane as the activator, and 65 psid of ethylene continuously fed into the reactor. The product produced in this example has a bimodal molecular weight distribution. GPC viscometry indicates long chain branching in the higher molecular weight fraction at a level of 0.2 branches/1000C or 0.65 branches/molecule. The average g' with respect to linear polyethylene was calculated at 0.89. The $^{13}$C NMR data indicated various lengths of short chain branching with the predominate branching being methyl. Total short chain branching was measured at 43.7 SCB/1000C.

Mixed Catalyst—Example M3

This example used a Group 10 catalyst (TM-7) to produce low molecular weight polymers/oligomers and a metallocene catalyst (TM-8) to produce higher molecular weight polymer. Standard polymerization conditions included the use of 400 ml of toluene as the solvent, 10 wt. % alumoxane as the activator, and 65 psid of ethylene continuously fed into the reactor. The product produced in this example has a bimodal molecular weight distribution. GPC viscometry indicates long chain branching in the higher molecular weight fraction at a level of 0.25 branches/1000C or 0.72 branches/molecule. The average g' with respect to linear polyethylene was calculated at 0.88. The $^{13}$C NMR data indicated various lengths of short chain branching with the predominate branching being methyl. Total short chain branching was measured at 39.5 SCB/1000C.

Mixed Catalyst—Example M4

This example used a Group 10 catalyst (TM-7) to produce low molecular weight polymers/oligomers and a metallocene catalyst (TM-9) to produce higher molecular weight polymer. Standard polymerization conditions included the use of 400 ml of hexane as the solvent, 10 wt. % alumoxane as the activator, and 65 psid of ethylene continuously fed into the reactor. The product produced in this example has a bimodal molecular weight distribution. The $^{13}$C NMR data indicated various lengths of short chain branching. Total short chain branching was measured at 18.2 SCB/1000C.

Mixed Catalyst—Example M5

This example used a Group 10 catalyst (TM-7) to produce low molecular weight polymers/oligomers and a Group 10 catalyst (TM-2) to produce higher molecular weight polymer. Standard polymerization conditions included the use of 400 ml of hexane as the solvent, 10 wt. % alumoxane as the activator, and 65 psid of ethylene continuously fed into the reactor. The product produced in this example had a bimodal molecular weight distribution. The $^{13}$C NMR data indicated various lengths of short chain branching with the predominate branching being methyl. Total short chain branching was measured at 102 SCB/1000C.

Mixed Catalyst—Example M6

This example used a Group 10 catalyst (TM-2) to produce a high molecular weight polymer and a Group 5 catalyst (TM-10) to also produce a high molecular weight polymer. Standard polymerization conditions included the use of 400 ml of hexane as the solvent, 15 wt. % aluminum sesquichloride in hexane as the activator, and 65 psid of ethylene continuously fed into the reactor. The molecular weight distribution of the polymer produced was narrow and there was no indication of short chain branching as measured by $^{13}$C NMR. The lack of bimodality and branching may be due to the low level of TM-2 used as compared to TM-10.

Example C1

This example is a comparison run using the metallocene catalyst (TM-8) alone. This metallocene was previously used in examples M1, M2 and M3, however, the reaction temperatures differed for the latter two. Standard polymerization conditions included the use of 400 ml of toluene as the solvent, 10 wt. % alumoxane as the activator, and 65 psid of ethylene continuously fed into the reactor. The polymer produced had a relatively narrow molecular weight distribution. There was no indication of short chain branching as measured by $^{13}$C NMR. GPC viscometry indicates long chain branching at a level of 0.05 branches/1000C or 0.235 branches/molecule. The average g' with respect to linear polyethylene was calculated at 0.96.

Example C2

This example is a comparison run using the metallocene catalyst (TM-9) alone. This metallocene was previously used in example M4. Standard polymerization conditions included the use of 400 ml of toluene as the solvent, 10 wt. % alumoxane as the activator, and 65 psid of ethylene continuously fed into the reactor. The polymer produced had a relatively narrow molecular weight distribution. There was no indication of short chain branching as measured by $^{13}$C NMR.

Example C3

This example is a comparison run using the Group 10 catalyst (TM-2) alone. This Group 10 compound was previously used in examples M5 and M6, however, only M6 uses the same activator as in this example. Standard polymerization conditions included the use of 400 ml of hexane as the solvent, 15 wt. % aluminum sesquichloride in hexane as the activator, and 65 psid of ethylene continuously fed into the reactor.

Example C4

This example is a comparison run using the Group 5 catalyst (TM-10) alone. This Group 5 compound was previously used in example M6. Standard polymerization conditions included the use of 400 ml of hexane as the solvent, 15 wt. % aluminum sesquichloride in hexane as the activator, and 65 psid of ethylene continuously fed into the reactor. The polymer produced had a relatively narrow molecular weight distribution. The $^{13}$C NMR data indicated various lengths of short chain branching with the predominate branching being methyl. Total short chain branching was measured at 82.7 SCB/1000C.

Example C5

This example is a comparison run using the Group 10 catalyst (TM-7) alone. This Group 10 compound was previously used in examples M1 through M5. This particular example utilized a 100 ml reactor, with 40 ml of toluene as the solvent, 170 mg of solid MAO (prepared from Albemarle 30 wt. % MAO that had been dried to a solid), and 65 psid of ethylene continuously fed into the reactor. The product isolated was an oily liquid that by $^1$H NMR showed a mixture of vinyl, vinylidene, vinylene and trisubstituted end-groups.

Mixed Catalyst—Example M7

This example used a Group 10 catalyst (TM-2) to produce a high molecular weight amorphous propylene based polymer and a classical Ziegler Natta propylene catalyst used with cyclohexylmethyldimethoxysilane as an external donor (S-X), to produce high molecular weight isotactic polypropylene polymer. Standard polymerization conditions included the use of 400 ml of propylene both as monomer and as the solvent, 25 wt. % TEAL in heptane as the activator and 28 mg of cyclohexylmethyldimethoxysilane as an external donor. Ethylene was not used. The material produced did not appear to be completely homogeneous. It appeared as a mixture of a crystalline polymer and an amorphous polymer. The polymers were physically kneaded together prior to submission for analysis. The polymer mixture produced had a bimodal molecular weight distribution. $^{13}$C NMR spectroscopy indicated that the polymer contained 36 mol % of an equivalent amount of ethylene (no ethylene was used). The predominant $(CH_2)_n$ sequence was n=1 (83%).

Mixed Catalyst—Example M8

This example used a Group 10 catalyst (TM-2) to produce a high molecular weight amorphous propylene based polymer and a metallocene catalyst (TM-8) to produce high molecular weight isotactic polypropylene polymer. Standard polymerization conditions included the use of 400 ml of propylene both as monomer and as the solvent and 10 wt. % MAO as the activator. Ethylene was not used. The product produced in this example is of narrow molecular weight distribution. $^{13}$C NMR spectroscopy indicated that the polymer contained 65 mol % of an equivalent amount of ethylene (no ethylene was used). The predominant $(CH_2)_n$ sequence was n=1 (29%) followed by n=2 (22%). The $^{13}$C NMR data indicated various lengths of short chain branching with the predominate branching being methyl. Total short chain branching was measured at 157.5 SCB/1000C (149.1% methyl, 2.5% ethyl, 0% propyl, 2.1% butyl, 1.5% pentyl and 2.4% branches greater than six in length).

Mixed Catalyst—Example M9

This example used a Group 10 catalyst (TM-7) to produce low molecular weight polymers/oligomers and a Group 10 catalyst (TM-11) to produce a moderate molecular weight amorphous propylene based polymer. Standard polymerization conditions included the use of 400 ml of propylene both as monomer and as the solvent and 10 wt. % MAO as the activator. Ethylene was not used. The product produced in this example largely resembles a polymer produced solely with the high molecular weight amorphous propylene based polymer of comparative example C9, however, there is a substantial increase in polymer molecular weight.

Example C6

This example is a comparison run using the Group 10 catalyst (TM-2) alone. This Group 10 compound was previously used in example M8. Standard polymerization conditions included the use of 400 ml of propylene both as monomer and as the solvent and 10 wt. % MAO as the activator. Ethylene was not used. The product produced in this example is of narrow molecular weight distribution. $^{13}$C NMR spectroscopy indicated that the polymer contained 42 mol % of an equivalent amount of ethylene (no ethylene was used). The predominant $(CH_2)_n$ sequence was n=1 (65%).

Example C7

This example is a comparison run using the Group 10 catalyst (TM-2) alone. This Group 10 compound was previously used in example M7. Standard polymerization conditions included the use of 400 ml of propylene both as monomer and as the solvent and 25 wt. % TEAL in heptane as the activator. Ethylene was not used. The product produced in this example is of narrow molecular weight distribution. $^{13}$C NMR spectroscopy indicated that the polymer contained 59 mol % of an equivalent amount of ethylene (no ethylene was used). The predominant $(CH_2)_n$ sequence was n=1 (57%).

Example C8

This example is a comparison run using a classical Ziegler Natta propylene catalyst used with cyclohexylmethyldimethoxysilane as an external donor (S-X), to produce high molecular weight isotactic polypropylene polymer. Standard polymerization conditions included the use of 400 ml of propylene both as monomer and as the solvent, 25 wt. % TEAL in heptane as the activator and 28 mg of cyclohexylmethyldimethoxysilane as an external donor. Ethylene was not used. The tacticity via $^{13}$C NMR was measured at 85% m dyads. The polymer produced has a broad molecular weight distribution, but not as broad and bimodal in appearance as in Example M7.

Example C9

This example is a comparison run using the Group 10 catalyst (TM-11) alone. This Group 10 compound was previously used in example M9. Standard polymerization conditions included the use of 400 ml of propylene both as monomer and as the solvent and 10 wt. % MAO as the activator. Ethylene was not used. The product produced in this example was of narrow molecular weight distribution. $^{13}$C NMR indicated that the polymer contained 27 mol % of an equivalent amount of ethylene (no ethylene was used). The predominant $(CH_2)_n$ sequence was n=1 and sequences of 5 and greater were not observed.

TABLE XIII

Polymerization data for ethylene polymerizations.

| Ex | TMC1 | TMC2 | μmol TMC1 | μmol TMC2 | Activator | mmol Al$^a$ | Al/TMC1$^b$ | Al/TMC2$^b$ | Al/M$^b$ | T (C) | Time (hr) | P (g)$^c$ | kgP/mol TMC · atm · hr$^d$ |
|---|---|---|---|---|---|---|---|---|---|---|---|---|---|
| M1 | TM-7 | TM-8 | 4.1 | 0.6 | A-1 | 4.5 | 1104 | 8027 | 971 | 80 | 0.5 | 33.6 | 3,280 |
| M2 | TM-7 | TM-8 | 12.2 | 2.8 | A-1 | 0.5 | 41 | 178 | 33 | 30 | 0.5 | 2.0 | 60 |
| M3 | TM-7 | TM-8 | 12.2 | 0.3 | A-1 | 0.5 | 41 | 1784 | 40 | 30 | 0.5 | 6.1 | 221 |
| M4 | TM-7 | TM-9 | 12.2 | 5.6 | A-1 | 0.5 | 41 | 89 | 28 | 80 | 0.5 | 10.0 | 254 |
| M5 | TM-7 | TM-2 | 12.2 | 24.1 | A-1 | 0.5 | 41 | 21 | 14 | 80 | 0.5 | 10.8 | 135 |
| M6 | TM-2 | TM-10 | 1.6 | 115.4 | A-2 | 0.4 | 265 | 4 | 4 | 30 | 0.08 | 9.6 | 223 |
| C1 | TM-8 | — | 0.6 | 0.0 | A-1 | 4.5 | 8027 | 0 | 8027 | 80 | 0.17 | 12.6 | 30,509 |
| C2 | TM-9 | — | 5.6 | 0.0 | A-1 | 4.5 | 803 | 0 | 803 | 80 | 0.5 | 5.6 | 452 |
| C3 | TM-2 | — | 1.6 | 0.0 | A-2 | 1.7 | 1059 | 0 | 1059 | 30 | 0.25 | 1.8 | 1,015 |
| C4 | TM-10 | — | 98.1 | 0.0 | A-2 | 1.7 | 17 | 0 | 17 | 30 | 0.08 | 10.2 | 282 |
| C5 | TM-7 | — | 16.0 | 0.0 | A-1 | 2.9 | 181 | 0 | 181 | 0 | 0.5 | — | — |

$^a$Aluminum based on the total molar amount of aluminum atoms in the activator.
$^b$Molar aluminum to transition metal ratio.
$^c$Grams of polymer produced.
$^d$Catalyst activity based on kg of polymer/mol TMC · atm ethylene · hr.

TABLE XIV

Polymerization data for propylene polymerizations.

| Ex | TMC1 | TMC2 | μmol TMC1 | μmol TMC2 | Activator | mmol Al$^a$ | Al/TMC1$^b$ | Al/TMC2$^b$ | Al/M$^b$ | T (C) | Time (hr) | P (g)$^c$ | kgP/mol TMC · atm · hr$^d$ |
|---|---|---|---|---|---|---|---|---|---|---|---|---|---|
| M7 | TM-2 | S-12 | 96.3 | 1.1 | A-3 | 3.1 | 32 | 2955 | 32 | 30 | 1.0 | 3.7 | 38 |
| M8 | TM-2 | TM-8 | 109.1 | 2.2 | A-1 | 7.5 | 69 | 3425 | 67 | 30 | 1.0 | 3.6 | 32 |
| M9 | TM-11 | TM-7 | 66.3 | 12.2 | A-1 | 4.5 | 68 | 368 | 57 | 30 | 1.0 | 8.3 | 106 |
| C6 | TM-2 | — | 96.3 | 0.0 | A-1 | 7.5 | 78 | 0 | 78 | 25 | 1.0 | 4.0 | 42 |
| C7 | TM-2 | — | 96.3 | 0.0 | A-3 | 7.8 | 81 | 0 | 81 | 30 | 1.0 | 4.8 | 50 |
| C8 | S-12 | — | 1.1 | 0.0 | A-3 | 3.1 | 2943 | 0 | 2943 | 30 | 1.0 | 3.8 | 3,585 |
| C9 | TM-11 | — | 66.3 | 0.0 | A-1 | 4.5 | 68 | 0 | 68 | 30 | 1.0 | 6.8 | 103 |

$^a$Aluminum based on the total molar amount of aluminum atoms in the activator.
$^b$Molar aluminum to transition metal ratio.
$^c$Grams of polymer produced.
$^d$Catalyst activity based on kg of polymer/mol TMC · hr.

TABLE XV

Polymer data for polymers from ethylene polymerization runs.

| Ex | MW$^a$ | MWD | MW$^b$ pk1 | MWD pk1 | MW$^c$ pk2 | MWD pk2 | mol %$^d$ | Me | Et | Pr | Bu | C$_5$ | C$_{6+}$ | total |
|---|---|---|---|---|---|---|---|---|---|---|---|---|---|---|
| M1 | 121 | 2.6 | — | — | — | — | 0.2 | — | — | — | — | — | — | 0 |
| M2 | 28 | 35.3 | 51 | 3.6 | 0.47 | 1.3 | 9.14 | 32.6 | 4.3 | 0 | 2.5 | 0 | 4.3 | 43.7 |
| M3 | 15 | 12.2 | 19 | 2.9 | 0.33 | 1.2 | 8.2 | 26.3 | 3.6 | 0.7 | 2.2 | 0 | 6.7 | 39.5 |
| M4 | 89 | 103 | 132 | 1.9 | 0.31 | 1.1 | 3.7 | 4.3 | 2.2 | 0 | 1 | 0 | 10.7 | 18.2 |
| M5 | 222 | 25.3 | 232 | 2.2 | 0.43 | 1.2 | 21.7 | 68.2 | 6.8 | 5.1 | 3.8 | 3.6 | 14.4 | 102 |
| M6 | 152 | 2.4 | — | — | — | — | 0 | — | — | — | — | — | — | — |
| C1 | 57 | 2.8 | — | — | — | — | 0 | — | — | — | — | — | — | — |
| C2 | 119 | 2.6 | — | — | — | — | 0 | — | — | — | — | — | — | — |
| C3 | 258 | 1.9 | — | — | — | — | 18 | 63.8 | 3.2 | 3.5 | 2.4 | 1.8 | 8 | 82.7 |
| C4 | 164 | 2.5 | — | — | — | — | 0 | 0 | 0 | 0 | 0 | 0 | 0 | 0 |

$^a$Full trace DRI weight average molecular weight × 10$^{-3}$. MWD = MW/Mn where Mn is the number average molecular weight.
$^b$DRI weight average molecular weight × 10$^{-3}$ for the higher molecular weight peak of a product with bimodal molecular weight distribution.
$^c$DRI weight average molecular weight × 10$^{-3}$ for the lower molecular weight peak of a product with bimodal molecular weight distribution.
$^d$Equivalent mol % of propylene in the polymer assuming all branches to be methyl branches.
$^e$Measurement of short chain branching per 1000 carbons of the polymer chain by $^{13}$C NMR; Me = methyl branches, Et = ethyl branches, Pr = propyl branches, Bu = butyl branches, C$_5$ = pentyl branches, C$_{6+}$ = branches of length six or greater; total = total number of SCB/1000C

TABLE XVI

Polymer data for polymers from propylene polymerization runs.

| Ex | MW[a] | MWD | MW[b] pk1 | MWD pk1 | MW[c] pk2 | MWD pk2 | mol %[d] | % distribution of $(CH_2)_n$ sequences[e] | | | | | | $L_{M6+}$ |
|---|---|---|---|---|---|---|---|---|---|---|---|---|---|---|
| | | | | | | | | n = 1 | n = 2 | n = 3 | n = 4 | n = 5 | n = 6+ | |
| M7 | 95 | 10.6 | 191 | 1.7 | 10.7 | 2.1 | 36 | 83 | 4 | 3 | 3 | 1 | 6 | 9.8 |
| M8 | 320 | 1.8 | — | — | — | — | 65 | 29 | 22 | 14 | 10 | 7 | 19 | 8.7 |
| M9 | 504 | 1.9 | — | — | — | — | na | — | — | — | — | — | — | — |
| C6 | 236 | 1.8 | — | — | — | — | 42 | 65 | 10 | 4 | 7 | 5 | 8 | 8.7 |
| C7 | 13 | 2.6 | — | — | — | — | 59 | 57 | 9 | 6 | 9 | 3 | 16 | 9.7 |
| C8 | 86 | 8.8 | — | — | — | — | — | — | — | — | — | — | — | — |
| C9 | 162 | 2.2 | — | — | — | — | 27 | 68 | 14 | 9 | 9 | 0 | 0 | — |

[a]Full trace DRI weight average molecular weight $\times 10^{-3}$. MWD = MW/Mn where Mn is the number average molecular weight.
[b]DRI weight average molecular weight $\times 10^{-3}$ for the higher molecular weight peak of a product with bimodal molecular weight distribution.
[c]DRI weight average molecular weight $\times 10^{-3}$ for the lower molecular weight peak of a product with bimodal molecular weight distribution.
[d]Equivalent mol % of ethylene in the polymer.
[e]Measurement by $^{13}C$ NMR; $L_{M6+}$ is the average length of methylene sequences which are 6 or greater in length.
na — not available

What is claimed is:

1. A process for polymerizing olefinically unsaturated monomers, the process comprising:
   (a) providing a mixed transition metal catalyst system comprising:
      (i) at least one late transition metal catalyst system;
      (ii) at least one different catalyst system selected from the group consisting of late transition metal catalyst systems, transition metal metallocene catalyst systems and Ziegler-Natta catalyst systems; and
      (iii) at least one activator,
      the late transition metal catalyst system comprising a late transition metal compound of the formula:

$LMX_r$ wherein
   M is a Group 9, 10 or 11 metal;
   L is a bidentate ligand defined by the formula:

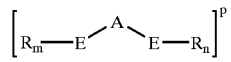

where
      A is a bridging group containing a Group 13–15 element;
      each E is independently a Group 15 or 16 element bonded to M; each R is independently a $C_1$–$C_{30}$ containing radical or diradical group which is a hydrocarbyl, substituted hydrocarbyl, halocarbyl, substituted halocarbyl, hydrocarbyl-substituted organometalloid or halocarbyl-substituted organometalloid;
      m and n are independently 1 or 2 depending on the valency of E; and
      p is the charge on the bidentate ligand such that the oxidation state of $MX_r$ is satisfied;
   each X is, independently, a hydride radical; a hydrocarbyl radical; a substituted hydrocarbyl radical; a halocarbyl radical; a substituted halocarbyl radical; a hydrocarbyl-substituted organometalloid or a halocarbyl-substituted organometalloid; a neutral, hydrocarbyl-containing donor ligand; a halogen; an alkoxide; an aryloxide; an amide; a phosphide; or other univalent anionic ligand; or two X's are joined and bound to the metal atom to form a metallacycle ring containing from about 3 to about 20 carbon atoms, or two X's are joined to form an anionic chelating ligand; or a neutral donor ligand not containing a hydrocarbyl radical; and
   r is 1, 2 or 3;
   the transition metal metallocene catalyst system comprising a Group 4, 5, 6, 9, or 10 transition metal compound having at least one cyclopentadienyl ligand; and
   the Ziegler-Natta transition metal catalyst system comprising a Group 4, 5 or 6 transition metal halide or oxyhalide activated for olefin polymerization by a Ziegler co-catalyst; and
   (b) contacting at least one olefinically unsaturated monomer with the mixed transition metal catalyst system under polymerization conditions, the at least one olefinically unsaturated monomer being selected from the group consisting of ethylene, $C_3$–$C_{20}$ α-olefins, $C_4$–$C_{20}$ gem-disubstituted olefins, $C_8$–$C_{20}$ aromatic substituted α-olefins, $C_5$–$C_{20}$ cyclic olefins, $C_5$–$C_{20}$ non-conjugated diolefins, and $C_{20}$–$C_{1000}$ vinyl or vinylidene-terminated macromers.

2. The process of claim 1, wherein the process produces a mixture of a first polymer produced from the late transition metal catalyst system and having a first molecular weight distribution with a first average molecular weight and a first composition distribution, and a second polymer produced from the different catalyst system and having a second molecular weight distribution with a second average molecular weight and a second composition distribution, and wherein the first and second composition distributions combined form an overall composition distribution, and the first and second molecular weight distributions combined form an overall molecular weight distribution.

3. The process of claim 2, wherein the at least one different catalyst system comprises a transition metal metallocene catalyst system or a Ziegler-Natta catalyst system.

4. The process of claim 2, wherein the at least one different catalyst system comprises a transition metal metallocene catalyst system.

5. The process of claim 3, wherein the step of contacting the at least one olefinically unsaturated monomer with the at least one different catalyst system takes place in the presence of a chain transfer agent effective to shift the second molecular weight distribution toward lower molecular weight without substantially affecting the first molecular weight distribution.

6. The process of claim 5, wherein the chain transfer agent is selected from the group consisting of hydrogen gas; silanes of the formula $H_{4-x}SiR'_x$, where x is 1, 2 or 3 and each R' is independently a $C_1$ to $C_{20}$ hydrocarbyl or hydrocarbyloxy radical; alcohols; and boranes.

7. The process of claim 5, wherein the chain transfer agent is hydrogen gas.

8. The process of claim 5, wherein the chain transfer agent is a silane of the formula $H_{4-x}SiR'_x$, where x is 1, 2 or 3 and each R' is independently methyl, ethyl, propyl, butyl, pentyl, hexyl, heptyl, nonyl, decyl, dodecyl, phenyl, methoxy, ethoxy, propoxy or phenoxy.

9. The process of claim 6, wherein the chain transfer agent is ethanol, isopropanol, phenol or catechol borane.

10. The process of claim 3, wherein the polymerization conditions are chosen so that the overall composition distribution has a composition distribution breadth index of from about 25% to 85%, and the overall molecular weight distribution is from about 1.5 to 4.5.

11. The process of claim 3, wherein the polymerization conditions are chosen so that the overall composition distribution has a composition distribution breadth index of from about 40% to 85%, and the overall molecular weight distribution is from about 2.0 to 3.5.

12. The process of claim 3, wherein the polymerization conditions are chosen so that the overall composition distribution has a composition distribution breadth index of from about 50% to 85%, and the overall molecular weight distribution is from about 2.0 to 3.0.

13. The process of claim 4, wherein the polymerization conditions are chosen so that the overall molecular weight distribution is broad or bimodal, and the overall composition distribution has a composition distribution breadth index of from about 70% to 100%.

14. The process of claim 4, wherein the polymerization conditions are chosen so that the overall molecular weight distribution is broad or bimodal, and the overall composition distribution has a composition distribution breadth index of from about 80% to 100%.

15. The process of claim 4, wherein the polymerization conditions are chosen so that the overall molecular weight distribution is broad or bimodal, and the overall composition distribution has a composition distribution breadth index of from about 85% to 100%.

16. The process of claim 3, wherein the polymerization conditions are chosen so that the overall molecular weight distribution is broad or bimodal, and the overall composition distribution has an orthogonally broad composition distribution breadth index of from about 25% to 85%.

17. The process of claim 3, wherein the polymerization conditions are chosen so that the overall molecular weight distribution is broad or bimodal, and the overall composition distribution has an orthogonally broad composition distribution breadth index of from about 50% to 85%.

18. The process of claim 2, wherein the at least one late transition metal catalyst system and the at least one different catalyst system are chosen so that the first weight average molecular weight is from about 0:5 to 2.2 times greater than the second weight average molecular weight.

19. The process of claim 2, wherein the at least one late transition metal catalyst system and the at least one different catalyst system are chosen so that the first weight average molecular weight is from about 0.5 to 2.0 times greater than the second weight average molecular weight.

20. The process of claim 2, wherein the at least one late transition metal catalyst system and the at least one different catalyst system are chosen so that the first weight average molecular weight is from about 0.5 to 1.75 times greater than the second weight average molecular weight.

21. The process of claim 2, wherein the at least one late transition metal catalyst system and the at least one different catalyst system are chosen so that the first weight average molecular weight is from about 1.5 to 25 times greater than the second weight average molecular weight.

22. The process of claim 2, wherein the at least one late transition metal catalyst system and the at least one different catalyst system are chosen so that the first weight average molecular weight is from about 1.5 to 15 times greater than the second weight average molecular weight.

23. The process of claim 2, wherein the at least one late transition metal catalyst system and the at least one different catalyst system are chosen so that the first weight average molecular weight is from about 1.5 to 10 times greater than the second weight average molecular weight.

24. The process of claim 3, wherein the late transition metal catalyst system is chosen to be effective to produce α-olefin oligomers, and the at least one different catalyst system is chosen to be effective to produce a polymer product wherein the α-olefin oligomers are incorporated into the product.

25. The process of claim 24, wherein the at least one olefinically unsaturated monomer is ethylene, and the process is effective to produce linear low density polyethylene.

26. The process of claim 3, wherein the late transition metal catalyst system is chosen to be effective to produce vinyl- or vinylidene-terminated macromers, and the at least one different catalyst system is chosen to be effective to produce a polymer product wherein the vinyl- or vinylidene-terminated macromers are incorporated into the product.

27. The process of claim 3, wherein the olefinically unsaturated monomer is propylene.

28. The process of claim 27, wherein the late transition metal catalyst system is chosen to be effective to produce an atactic ethylene-propylene copolymer, the at least one different catalyst system is chosen to be effective to produce isotactic polypropylene, and the process produces a mixture of the atactic copolymer and the isotactic polypropylene.

29. The process of claims 28, wherein the mixture contains about 13 to 30 mole percent of the atactic polymer.

30. The process of claim 28, wherein the mixture contains about 6 to 13 mole percent of the atactic polymer.

31. The process of claim 28, wherein the mixture contains about 30 to 60 mole percent of the atactic polymer.

32. The process of claim 1, wherein the process is carried out in a single reactor.

33. The process of claim 1, wherein the polymerization conditions are adapted for gas phase polymerization.

34. The process of claim 1, wherein the polymerization conditions are adapted for slurry polymerization.

35. The process of claim 1, wherein the polymerization conditions are adapted for solution, bulk or supercritical polymerization.

36. A process for producing a polymer mixture having a predetermined molecular weight distribution and a predetermined composition distribution by polymerizing olefinically unsaturated monomers, the process comprising:
(a) providing a mixed transition metal catalyst system comprising:
(i) at least one late transition metal catalyst system comprising a late transition metal compound of the formula:

$LMX_r$ wherein
M is a Group 9, 10 or 11 metal;
L is a bidentate ligand defined by the formula:

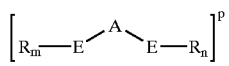

where
A is a bridging group containing a Group 13–15 element;
each E is independently a Group 15 or 16 element bonded to M;
each R is independently a $C_1$–$C_{30}$ containing radical or diradical group which is a hydrocarbyl, substituted hydrocarbyl, halocarbyl, substituted halocarbyl, hydrocarbyl-substituted organometalloid or halocarbyl-substituted organometalloid;
m and n are independently 1 or 2 depending on the valency of E; and
p is the charge on the bidentate ligand such that the oxidation state of $MX_r$ is satisfied;
each X is, independently, a hydride radical, a hydrocarbyl radical, a substituted hydrocarbyl radical, a halocarbyl radical, a substituted halocarbyl radical, a hydrocarbyl-substituted organometalloid or a halocarbyl-substituted organometalloid, a neutral hydrocarbyl containing donor ligand, a halogen, an alkoxide, an aryloxide, an amide, a phosphide, or other univalent anionic ligand, or two X's are joined and bound to the metal atom to form a metallacycle ring containing from about 3 to about 20 carbon atoms, or two X's are joined to form an anionic chelating ligand; or a neutral donor ligand not containing a hydrocarbyl radical and
r is 1,2 or 3;
(ii) at least one transition metal metallocene catalyst system comprising a Group 4, 5, 6, 9, or 10 transition metal compound having one or two cyclopentadienyl ligands; and
(iii) at least one activator; and
(b) contacting at least one olefinically unsaturated monomer with the mixed transition metal catalyst system under polymerization conditions in a single reactor, the at least one olefinically unsaturated monomer being selected from the group consisting of ethylene, $C_3$–$C_{20}$ α-olefins, $C_4$–$C_{20}$ gem-disubstituted olefins, $C_8$–$C_{20}$ aromatic substituted α-olefins, $C_5$–$C_{20}$ cyclic olefins, $C_5$–$C_{20}$ non-conjugated diolefins, and $C_{20}$–$C_{1000}$ vinyl or vinylidene-terminated macromers, and thereby forming a mixture of a first polymer produced from the late transition metal catalyst system and having a first molecular weight distribution with a first average molecular weight and a first composition distribution, and a second polymer produced from the transition metal metallocene catalyst system and having a second molecular weight distribution with a second average molecular weight and a second composition distribution, the first and second composition distributions combined forming the predetermined composition distribution, and the first and second molecular weight distributions combined forming the predetermined molecular weight distribution.

37. The process of claim 36, wherein the step of contacting the at least one olefinically unsaturated monomer with the mixed transition metal catalyst system takes place in the presence of a chain transfer agent effective to shift the second molecular weight distribution toward lower molecular weight without substantially affecting the first molecular weight distribution.

38. The process of claim 37, wherein the chain transfer agent is selected from the group consisting of hydrogen gas; silanes of the formula $H_{4-x}SiR'_x$, where x is 1, 2 or 3 and each R' is independently a $C_1$ to $C_{20}$ hydrocarbyl or hydrocarbyloxy radical; alcohols; and boranes.

39. The process of claim 36, wherein the polymerization conditions are chosen so that the predetermined composition distribution has a composition distribution breadth index of from about 25% to 85%, and the predetermined molecular weight distribution is from about 1.5 to 4.5.

40. The process of claim 36, wherein the polymerization conditions are chosen so that the predetermined composition distribution has a composition distribution breadth index of from about 40% to 85%, and the predetermined molecular weight distribution is from about 2.0 to 3.5.

41. The process of claim 36, wherein the polymerization conditions are chosen so that the predetermined composition distribution has a composition distribution breadth index of from about 50% to 85%, and the predetermined molecular weight distribution is from about 2.0 to 3.0.

42. The process of claim 36, wherein the polymerization conditions are chosen so that the predetermined molecular weight distribution is broad or bimodal, and the predetermined composition distribution has a composition distribution breadth index of from about 70% to 100%.

43. The process of claim 36, wherein the polymerization conditions are chosen so that the predetermined molecular weight distribution is broad or bimodal, and the predetermined composition distribution has a composition distribution breadth index of from about 80% to 100%.

44. The process of claim 36, wherein the polymerization conditions are chosen so that the predetermined molecular weight distribution is broad or bimodal, and the predetermined composition distribution has a composition distribution breadth index of from about 85% to 100%.

45. The process of claim 36, wherein the polymerization conditions are chosen so that the predetermined molecular weight distribution is broad or bimodal, and the predetermined composition distribution has an orthogonally broad composition distribution breadth index of from about 25% to 85%.

46. The process of claim 36, wherein the polymerization conditions are chosen so that the predetermined molecular weight distribution is broad or bimodal, and the predetermined composition distribution has an orthogonally broad composition distribution breadth index of from about 50% to 85%.

47. The process of claim 36, wherein the at least one late transition metal catalyst system and the at least one transition metal metallocene catalyst system are chosen so that the first weight average molecular weight is from about 0.5 to 2.2 times greater than the second weight average molecular weight.

48. The process of claim 36, wherein the at least one late transition metal catalyst system and the at least one transition metal metallocene catalyst system are chosen so that the first weight average molecular weight is from about 0.5 to 2.0 times greater than the second weight average molecular weight.

49. The process of claim 36, wherein the at least one late transition metal catalyst system and the at least one transition metal metallocene catalyst system are chosen so that the first weight average molecular weight is from about 0.5 to 1.75 times greater than the second weight average molecular weight.

50. The process of claim 36, wherein the at least one late transition metal catalyst system and the at least one transition metal metallocene catalyst system are chosen so that the first weight average molecular weight is from about 1.5 to 25 times greater than the second weight average molecular weight.

51. The process of claim 36, wherein the at least one late transition metal catalyst system and the at least one transition metal metallocene catalyst system are chosen so that the first weight average molecular weight is from about 1.5 to 15 times greater than the second weight average molecular weight.

52. The process of claim 36, wherein the at least one late transition metal catalyst system and the at least one transition metal metallocene catalyst system are chosen so that the first weight average molecular weight is from about 1.5 to 10 times greater than the second weight average molecular weight.

53. A process for incorporating α-olefin oligomers, vinyl-terminated macromers or vinylidene-terminated macromers into a polymer, the process comprising:
  (a) providing a mixed transition metal catalyst system comprising:
    (i) at least one late transition metal catalyst system comprising a late transition metal compound of the formula:

LMX$_r$ wherein
    M is a Group 9, 10 or 11 metal;
    L is a bidentate ligand defined by the formula:

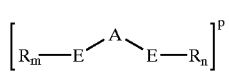

where
      A is a bridging group containing a Group 13–15 element;
      each E is independently a Group 15 or 16 element bonded to M;
      each R is independently a $C_1$–$C_{30}$ containing radical or diradical group which is a hydrocarbyl, substituted hydrocarbyl, halocarbyl, substituted halocarbyl, hydrocarbyl-substituted organometalloid or halocarbyl-substituted organometalloid;
      m and n are independently 1 or 2 depending on the valency of E; and
      p is the charge on the bidentate ligand such that the oxidation state of MX$_r$ is satisfied;
    each X is, independently, a hydride radical, a hydrocarbyl radical, a substituted hydrocarbyl radical, a halocarbyl radical, a substituted halocarbyl radical, a hydrocarbyl-substituted organometalloid or a halocarbyl-substituted organometalloid, a neutral hydrocarbyl containing donor ligand, a halogen, an alkoxide, an aryloxide, an amide, a phosphide, or other univalent anionic ligand, or two X's are joined and bound to the metal atom to form a metallacycle ring containing from about 3 to about 20 carbon atoms, or two X's are joined to form an anionic chelating ligand; or a neutral donor ligand not containing a hydrocarbyl radical and
    r is 1, 2 or 3;
    the late transition metal catalyst system being chosen to be effective to produce α-olefin oligomers, vinyl-terminated macromers, or vinylidene-terminated macromers from olefinically unsaturated monomers,
    (ii) at least one transition metal metallocene catalyst system comprising a Group 4, 5, 6, 9, or 10 transition metal compound having one or two cyclopentadienyl ligands, the transition metal metallocene catalyst system being chosen to be effective to produce polymers incorporating the α-olefin oligomers, vinyl-terminated macromers or vinylidene-terminated macromers produced by the late transition metal catalyst system; and
    (iii) at least one activator; and
  (b) contacting at least one olefinically unsaturated monomer with the mixed transition metal catalyst system under polymerization conditions in a single reactor, the at least one olefinically unsaturated monomer being selected from the group consisting of ethylene, $C_3$–$C_{20}$ α-olefins, $C_4$–$C_{20}$ gem-disubstituted olefins, $C_8$–$C_{20}$ aromatic substituted α-olefins, $C_5$–$C_{20}$ cyclic olefins, $C_5$–$C_{20}$ non-conjugated diolefins, and $C_{20}$–$C_{1000}$ vinyl or vinylidene-terminated macromers, and thereby forming a polymer incorporating the α-olefin oligomers, vinyl-terminated macromers or vinylidene-terminated macromers produced by the late transition metal catalyst system.

54. A process for producing an impact copolymer, a thermoplastic olefin, or a thermoplastic elastomer in a single reactor, the process comprising:
  (a) providing a mixed transition metal catalyst system comprising:
    (i) at least one late transition metal catalyst system comprising a late transition metal compound of the formula:

LMX$_r$ wherein
    M is a Group 9, 10 or 11 metal;
    L is a bidentate ligand defined by the formula:

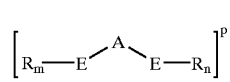

where
      A is a bridging group containing a Group 13–15 element;
      each E is independently a Group 15 or 16 element bonded to M;
      each R is independently a $C_1$–$C_{30}$ containing radical or diradical group which is a hydrocarbyl, substituted hydrocarbyl, halocarbyl, substituted halocarbyl, hydrocarbyl-substituted organometalloid or halocarbyl-substituted organometalloid;

m and n are independently 1 or 2 depending on the valency of E; and p is the charge on the bidentate ligand such that the oxidation state of $MX_r$ is satisfied;

each X is, independently, a hydride radical, a hydrocarbyl radical, a substituted hydrocarbyl radical, a halocarbyl radical, a substituted halocarbyl radical, a hydrocarbyl-substituted organometalloid or a halocarbyl-substituted organometalloid, a neutral hydrocarbyl containing donor ligand, a halogen, an alkoxide, an aryloxide, an amide, a phosphide, or other univalent anionic ligand, or two X's are joined and bound to the metal atom to form a metallacycle ring containing from about 3 to about 20 carbon atoms, or two X's are joined to form an anionic chelating ligand or a neutral donor ligand not containing a hydrocarbyl radical and r is 1, 2 or 3;

the late transition metal catalyst system being chosen to be effective to produce an atactic polymer having the characteristics of an ethylene-propylene copolymer;

(ii) at least one transition metal metallocene catalyst system comprising a Group 4, 5, 6, 9, or 10 transition metal compound having one or two cyclopentadienyl ligands, the transition metal metallocene catalyst system being chosen to be effective to produce isotactic polypropylene; and (iii) at least one activator; and (b) contacting propylene with the mixed transition metal catalyst system under polymerization conditions in a single reactor to thereby produce a product mixture of the atactic polymer and the isotactic polypropylene.

55. The process of claim 54, wherein the product mixture contains about 13 to 30 mole percent of the atactic polymer.

56. The process of claim 54, wherein the product mixture contains about 6 to 13 mole percent of the atactic polymer.

57. The process of claim 54, wherein the product mixture contains about 30 to 60 mole percent of the atactic polymer.

* * * * *